US008046218B2

(12) United States Patent
Allen et al.

(10) Patent No.: US 8,046,218 B2
(45) Date of Patent: Oct. 25, 2011

(54) SPEECH AND METHOD FOR IDENTIFYING PERCEPTUAL FEATURES

(75) Inventors: Jont B. Allen, Mahomet, IL (US); Marion Regnier, Brooklyn, NY (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1047 days.

(21) Appl. No.: 11/857,137

(22) Filed: Sep. 18, 2007

(65) Prior Publication Data

US 2008/0071539 A1 Mar. 20, 2008

Related U.S. Application Data

(60) Provisional application No. 60/905,289, filed on Mar. 5, 2007, provisional application No. 60/888,919, filed on Feb. 8, 2007, provisional application No. 60/845,741, filed on Sep. 19, 2006.

(51) Int. Cl.

| | |
|---|---|
| ***G10L 15/20*** | (2006.01) |
| ***G10L 19/00*** | (2006.01) |
| ***G10L 19/14*** | (2006.01) |
| ***G10L 15/04*** | (2006.01) |

(52) U.S. Cl. ..................... 704/233; 704/200.1; 704/205; 704/254

(58) Field of Classification Search ........................ None
See application file for complete search history.

(56) References Cited

U.S. PATENT DOCUMENTS

| | | | | |
|---|---|---|---|---|
| 5,583,969 | A | 12/1996 | Yoshizumi et al. | |
| 5,745,873 | A | 4/1998 | Braida et al. | |
| 5,884,260 | A * | 3/1999 | Leonhard | 704/254 |
| 6,308,155 | B1 * | 10/2001 | Kingsbury et al. | 704/256.1 |
| 6,570,991 | B1 * | 5/2003 | Scheirer et al. | 381/110 |
| 7,065,485 | B1 | 6/2006 | Chong-White et al. | |
| 7,292,974 | B2 * | 11/2007 | Kemp | 704/234 |
| 7,444,280 | B2 * | 10/2008 | Vandali et al. | 704/200.1 |

(Continued)

FOREIGN PATENT DOCUMENTS

EP 1901286 3/2008

(Continued)

OTHER PUBLICATIONS

Hu, G. et al. "Separation of Stop Consonants," Acoustics, Speech, and Signal Processing, 2003. Proceedings. (ICASSP '03). 2003 IEEE International Conference on, pp. II-749-II-752 vol. 2.*

(Continued)

*Primary Examiner* — Matthew Sked
(74) *Attorney, Agent, or Firm* — Kilpatrick Townsend & Stockton LLP

(57) ABSTRACT

A system and method for phone detection. The system includes a microphone configured to receive a speech signal in an acoustic domain and convert the speech signal from the acoustic domain to an electrical domain, and a filter bank coupled to the microphone and configured to receive the converted speech signal and generate a plurality of channel speech signals corresponding to a plurality of channels respectively. Additionally, the system includes a plurality of onset enhancement devices configured to receive the plurality of channel speech signals and generate a plurality of onset enhanced signals. Each of the plurality of onset enhancement devices is configured to receive one of the plurality of channel speech signals, enhance one or more onsets of one or more signal pulses for the received one of the plurality of channel speech signals, and generate one of the plurality of onset enhanced signals.

22 Claims, 14 Drawing Sheets

U.S. PATENT DOCUMENTS

| | | | | |
|---|---|---|---|---|
| 2004/0252850 | A1 | 12/2004 | Turicchia et al. | |
| 2005/0281359 | A1 | 12/2005 | Echols, Jr. | |
| 2007/0088541 | A1 * | 4/2007 | Vos et al. | 704/219 |

FOREIGN PATENT DOCUMENTS

| | | |
|---|---|---|
| WO | WO 2008/036768 | 3/2008 |

OTHER PUBLICATIONS

Allen, J. B. (2001). "Nonlinear cochlear signal processing," in Jahn, A. and Santos-Sacchi. J., editors, *Physiology of the Ear, Second Edition*, chapter 19, pp. 393-442. Singular Thomson Learning, 401 West A Street, Suite 325 San Diego, CA 92101.

Allen, J. B. (2004). "The articulation Index is a Shannon channel capacity," in Pressnitzer, D., de Cheveigné, A., McAdams, S., and Collet, L., editors, *Auditory signal processing: physiology, psychoacoustics, and models*, chapter Speech, pp. 314-320. Springer Verlag, New York, NY.

Allen, J. B. and Neely, S. T. (1997). "Modeling the relation between the intensity JND and loudness for pure tones and wide-band noise," *J. Acoust. Soc. Am*. 102(6):3628-3646.

Bilger, R. and Wang, M. (1976). "Consonant confusions in patients with sense-oryneural loss," *J. of Speech and hearing research* 19(4):718-748. MDS Groups of HI Subject, by Hearing Loss. Measured Confusions.

Boothroyd, A. (1968). "Statistical theory of the speech discrimination score," *J. Acoust Soc. Am*. 43(2):362-367.

Boothroyd, A. (1978). "Speech preception and sensorineural hearing loss," in Studebaker, G. A. and Hochberg, I., editors, *Auditory Management of hearing-impaired children* Principles and prerequisites for intervention, pp. 117-144. University Park Press, Baltimore.

Boothroyd, A. and Nittrouer, S. (1988). "Mathematical treatment of context effects in phoneme and word recognition," *J. Acoust. Soc. Am*. 84(1):101-114.

Bronkhorst, A. W., Bosman, A. J., and Smoorenburg, G. F. (1993). A model for context effects in speech recognition, *J. Acoust. Soc. Am*. 93(1):499-509.

Carlyon, R. P. and Shamma, S. (2003). "A account of monaural phase sensitivity" *J. Acoust. Soc. Am*. 114(1):333-348.

Dau, Verhey, and Kohlrausch (1999). "Intrinsic envelope fluctuations and modulation-detection thresholds for narrow-band noise carriers," *J. Acoust. Soc. Am*. 106(5):2752-2760.

Delattre, P., Liberman, A., and Cooper, F. (1955). "Acoustic loci and translational cues for consonants," *J. of the Acoust. Soc. of Am*. 24(4):769-773. Haskins Work on Painted Speech.

Drullman, R., Festen, J. M., and Plomp, R. (1994). "Effect of temporal envelope smearing on speech reception," *J. Acoust. Soc. Am*. 95(2):1053-1064.

Dunn. H. K. and White, S. D. (1940). "Statistical measurements on conversational speech," *J. of the Acoust Soc. of Am*. 11:278-288.

Dusan and Rabiner, L. (2005). "Can automatic speech recognition learn more from human speech perception?," in Bunleanu, editor, *Trends in Speech Technology*, pp. 21-36. Romanian Academic Publisher.

Flanagan, J. (1965). *Speech analysis synthesis and perception*. Academic Press Inc., New York, NY.

Hall, J., Haggard, M., and Fernandes, M. (1984). "Detection in noise by spectrotemporal pattern analysis" *J. Acoust. Soc. Am*. 76:50-56.

Houtgast, T. (1989). "Frequency selectivity in amplitude-modulation detection," *J. Acoust. Soc. Am*. 85(4):1676-1680.

Lobdell, B. and Allen, J. (2005). Modeling and using the vu meter with comparisions to rms speech levels; *J. Acoust. Soc. Am*. Submitted on Sep. 20, 2005; Second Submission Following First Reviews Mar. 13, 2006.

Mathes, R. and Miller, R. (1947). "Phase effects in monaural perception," *J. Acoust. Soc. Am*. 19:780.

Miller, G. A. (1962). "Decision units in the perception of speech," *IRE Transactions on Information Theory* 82(2):81-83.

Miller, G. A. and Isard, S. (1963). "Some perceptual consequences of linguistic rules," *Jol. of Verbal Learning and Verbal Behavior* 2:217-228.

Rabiner, L. (2003). "The power of speech," *Science* 301:1494-1495.

Rayleigh, L. (1908). "Acoustical notes—viii," *Philosophical Magazine* 16(6):235-246.

Riesz, R. R. (1928). "Differential intensity sensitivity of the ear for pure tones," *Phy. Rev*. 31(2):867-875.

Zwicker, E., Flottorp, G., and Stevens, S. (1957). "Critical bandwidth in loudness summation," *J. Acoust. Soc. Am*. 29(5):548-557.

Shepard, R. "Psychological representation of speech sounds" In David, E. & Denies, P. (eds.) *Human Communication: A unified View*, chap. 4, 67-113 (McGraw-Hill, New York, 1972).

Wang, M. D. & Bilger, R. C. "Consonant confusions in noise: A study of perceptual features" *J. Acoust. Soc. Am*. 54, 1248-1266 (1973).

Allen, J. B. "Consonant recognition and the articulation index", *J. Acoust. Soc. Am*. 117, 2212-2223 (2005).

Allen, J. B. *Articulation and Intelligibility* (Morgan and Claypool, 3401 Buck-skin Trail, LaPorte, CO 80535, 2005). ISBN: 1598290088.

Soli, S. D., Arabie, P. & Carroll, J. D. "Discrete represenation of perceptual structure underlying consonant confusions" *J. Acoust. Soc. Am*. 79, 826-837 (1986).

Miller, G. A. & Nicely, P. E. "An analysis of perceptual confusions among some English consonants" *J Acoust. Soc. Am*. 27, 338-352 (1955).

Dubno, J. R. & Levitt, H. "Predicting consonant confusions from acoustic Analysis" *J. Acoust. Soc. Am*. 69, 249-261 (1981).

Gordon-Salant, S. "Consonant recognition and confusion patterns among elderly hearing-impaired subjects" *Ear and Hearing 8*, 270-276 (1987).

Cooper, F., Delattre, P., Liberman, A., Borst J. & Gerstman, L. "Some experiments on the perception of synthetic speech sounds" *J. Acoust. Soc. Am*. 24, 579-606(1952).

Regnier, M. & Allen, J. B. "The importance of across-frequency timing coincidences in the perception of some English consonants in noise" In *Abst*. (ARO, Denver, 2007).

Furui, S. "On the role of spectral transition for speech perception" *J. Acoust. Soc. Am*. 80, 1016-1025 (1986).

Lobdell, B. & Allen, J. B. "An information theoretic tool for investigating speech perception" Interspeech 2006, pp. 1-4.

Allen, J. B. "Short time spectral analysis, synthesis, and modification by discrete Fourier transform" *IEEE Trans. Acoust. Speech and Sig. Processing* 25, 235-238 (1977).

Allen, J. B. & Rabiner, L. R. "A unified approach to short-time Fourier analysis and synthesis" *Proc. IEEE 65*, 1558-1564 (1977).

Shannon, R. V., Zeng, F. G., Kamath, V., Wygonski, J. & Ekelid, M. "Speech recognition with primarily temporal cues" *Science 270*, 303-304 (1995).

Loizou, P., Dorman, M. & Zhemin, T. "On the number of channels needed to understand speech" *J. Acoust. Soc. Am*. 106, 2097-2103 (1999).

French, N. R. & Steinberg, J. C. "Factors governing the intelligibility of speech sounds" *J. Acoust. Soc. Am*. 19, 90-119 (1947).

Hermansky, H. & Fousek, P. "Multi-resolution RASTA filtering for TANDEM-based ASR" In *Proceedings of Interspeech 2005* (2005). IDIAP-RR 2005-18.

Lovitt, A. & Allen, J. "50 Years Late: Repeating Miller-Nicely 1955" Interspeech 2006, p. 1-4.

Allen, J. B. "How do humans process and recognize speech?" *IEEE Transactions on speech and audio processing 2*, 567-577 (1994).

Allen, J. B. "Harvey Fletcher's role in the creation of communication acoustics" *J. Acoust. Soc. Am*. 99, 1825-1839 (1996).

Fletcher, H. and Galt, R. (1950), "The Perception of Speech and Its Relation to Telephony," J. Acoust. Soc. Am. 22, 89-151.

Phatak, S. and Allen, J. B. (Apr. 2007a), "Consonant and vowel confusions in speech-weighted noise," J. Acoust. Soc. Am. 121(4), 2312-26.

Phatak, S. and Allen, J. B. (Mar. 2007b), "Consonant profiles for individual Hearing-Impaired listeners," in *AAS Annual Meeting* (American Auditory Society).

Repp, B., Liberman, A., Eccardt, T., and Pesetsky, D. (Nov. 1978), "Perceptual integration of acoustic cues for stop, fricative, and affricate manner," J. Exp. Psychol 4(4), 621-637.

Shannon, C. E. (1948), "A mathematical theory of communication" Bell System Tech. Jol. 27, 379-423 (parts I, II), 623-656 (part III).

Peter Heil, "Coding of temporal onset envelope in the auditory system" Speech Communication 41 (2003) 123-134.
Regnier, M. and Allen, J.B. (2007b), "Perceptual cues of some CV sounds studied in noise" in Abstracts (AAS, Scottsdale).
Phatak et al. "Consonant-Vowel interaction in context-free syllables" University of Illinois at Urbana-Champaign, Sep. 30, 2005.
International Search Report and Written Opinion for PCT/US07/78940 dated Jun. 19, 2008.
Search Report and Written Opinion corresponding to the PCT/US2009/049533 application.
Search Report and Written Opinion corresponding to the PCT/US2009/051747 application.
Reigner et al.: "A method to identify noise-robust perceptual features: Application for consonant *It/*" 1. Acoust. SOc. Am., vol. 123, No. 5, May 2008, pp. 2801-2814, XP002554701.
Phatak et al., "Measuring nonsense CV confusions under speech-weighted noise" University of Illinois at Urbana-Champaign, 2005 ARO Midwinter Meeting, New Orleans, LA.

* cited by examiner

Prior Art

Prior Art (a) Truncation of f105ta at 12 (top) and 0 dB SNR (bottom).

(b) Truncation of f109ta at 12 (top) and 0 dB SNR (bottom).

(c) Truncation of f119ta at 12 (top) and 0 dB SNR (bottom).

(d) Truncation of m111ta at 12 (top) and 0 dB SNR (bottom).

(a) Truncation of m102ta at 12 (top) and 0 dB SNR (bottom).

(b) Truncation of m104ta at 12 (top) and 0 dB SNR (bottom).

(c) Truncation of m107ta at 12 (top) and 0 dB SNR (bottom).

(d) Truncation of m117ta at 12 (top) and 0 dB SNR (bottom).

SPEECH AND METHOD FOR IDENTIFYING PERCEPTUAL FEATURES

CROSS-REFERENCES TO RELATED APPLICATIONS

This application claims priority to U.S. Provisional Application No. 60/845,741, filed Sep. 19, 2006, U.S. Provisional Application No. 60/888,919, filed Feb. 8, 2007, and U.S. Provisional Application No. 60/905,289, filed Mar. 5, 2007, all which are commonly assigned and incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to identification of perceptual features. More particularly, the invention provides a system and method, for such identification, using one or more events related to coincidence between various frequency channels. Merely by way of example, the invention has been applied to phone detection. But it would be recognized that the invention has a much broader range of applicability.

After many years of work, a basic understanding of speech robustness to masking noise often remains a mystery. Specifically, it is usually unclear how to correlate the confusion patterns with the audible speech information in order to explain normal hearing listeners confusions and identify the spectro-temporal nature of the perceptual features. For example, the confusion patterns are speech sounds (such as Consonant-Vowel, CV) confusions vs. signal-to-noise ratio (SNR). Certain conventional technology can characterize invariant cues by reducing the amount of information available to the ear by synthesizing simplified CVs based only on a short noise burst followed by artificial formant transitions. However, often, no information can be provided about the robustness of the speech samples to masking noise, nor the importance of the synthesized features relative to other cues present in natural speech. But a reliable theory of speech perception is important in order to identify perceptual features. Such identification can be used for developing new hearing aids and cochlear implants and new techniques of speech recognition.

Hence it is highly desirable to improve techniques for identifying perceptual features.

BRIEF SUMMARY OF THE INVENTION

The present invention is directed to identification of perceptual features. More particularly, the invention provides a system and method, for such identification, using one or more events related to coincidence between various frequency channels. Merely by way of example, the invention has been applied to phone detection. But it would be recognized that the invention has a much broader range of applicability.

According to one embodiment, a system for phone detection includes a microphone configured to receive a speech signal in an acoustic domain and convert the speech signal from the acoustic domain to an electrical domain, and a filter bank coupled to the microphone and configured to receive the converted speech signal and generate a plurality of channel speech signals corresponding to a plurality of channels respectively. Additionally, the system includes a plurality of onset enhancement devices configured to receive the plurality of channel speech signals and generate a plurality of onset enhanced signals. Each of the plurality of onset enhancement devices is configured to receive one of the plurality of channel speech signals, enhance one or more onsets of one or more signal pulses for the received one of the plurality of channel speech signals, and generate one of the plurality of onset enhanced signals. Moreover, the system includes a cascade of across-frequency coincidence detectors configured to receive the plurality of onset enhanced signals and generate a plurality of coincidence signals. Each of the plurality of coincidence signals is capable of indicating a plurality of channels at which a plurality of pulse onsets occur within a predetermined period of time, and the plurality of pulse onsets corresponds to the plurality of channels respectively. Also, the system includes an event detector configured to receive the plurality of coincidence signals, determine whether one or more events have occurred, and generate an event signal, the event signal being capable of indicating which one or more events have been determined to have occurred. Additionally, the system includes a phone detector configured to receive the event signal and determine which phone has been included in the speech signal received by the microphone.

According to another embodiment, a system for phone detection includes a plurality of onset enhancement devices configured to receive a plurality of channel speech signals generated from a speech signal in an acoustic domain, process the plurality of channel speech signals, and generate a plurality of onset enhanced signals. Each of the plurality of onset enhancement devices is configured to receive one of the plurality of channel speech signals, enhance one or more onsets of one or more signal pulses for the received one of the plurality of channel speech signals, and generate one of the plurality of onset enhanced signals. Additionally, the system includes a cascade of across-frequency coincidence detectors including a first stage of across-frequency coincidence detectors and a second stage of across-frequency coincidence detectors. The cascade is configured to receive the plurality of onset enhanced signals and generate a plurality of coincidence signals. Each of the plurality of coincidence signals is capable of indicating a plurality of channels at which a plurality of pulse onsets occur within a predetermined period of time, and the plurality of pulse onsets corresponds to the plurality of channels respectively. Moreover, the system includes an event detector configured to receive the plurality of coincidence signals, and determine whether one or more events have occurred based on at least information associated with the plurality of coincidence signals. The event detector is further configured to generate an event signal, and the event signal is capable of indicating which one or more events have been determined to have occurred. Also, the system includes a phone detector configured to receive the event signal and determine, based on at least information associated with the event signal, which phone has been included in the speech signal in the acoustic domain.

According to yet another embodiment, a method for phone detection includes receiving a speech signal in an acoustic domain, converting the speech signal from the acoustic domain to an electrical domain, processing information associated with the converted speech signal, and generating a plurality of channel speech signals corresponding to a plurality of channels respectively based on at least information associated with the converted speech signal. Additionally, the method includes processing information associated with the plurality of channel speech signals, enhancing one or more onsets of one or more signal pulses for the plurality of channel speech signals to generate a plurality of onset enhanced signals, processing information associated with the plurality of onset enhanced signals, and generating a plurality of coincidence signals based on at least information associated with the plurality of onset enhanced signals. Each of the plurality of coincidence signals is capable of indicating a plurality of channels at which a plurality of pulse onsets occur within a predetermined period of time, and the plurality of pulse onsets corresponds to the plurality of channels respectively. Moreover, the method includes processing information associated with the plurality of coincidence signals, determining whether one or more events have occurred based on at least information associated with the plurality of coincidence signals, generating an event signal, the event signal being capable of indicating which one or more events have been determined to have occurred, processing information associated with the event signal, and determining which phone has been included in the speech signal in the acoustic domain.

Depending upon the embodiment, one or more of benefits may be achieved. These benefits will be described in more detail throughout the present specification and more particularly below. Additional objects and features of the present invention can be more fully appreciated with reference to the detailed description and the accompanying drawings that follow.

DETAILED DESCRIPTION OF THE INVENTION

Figure 1:
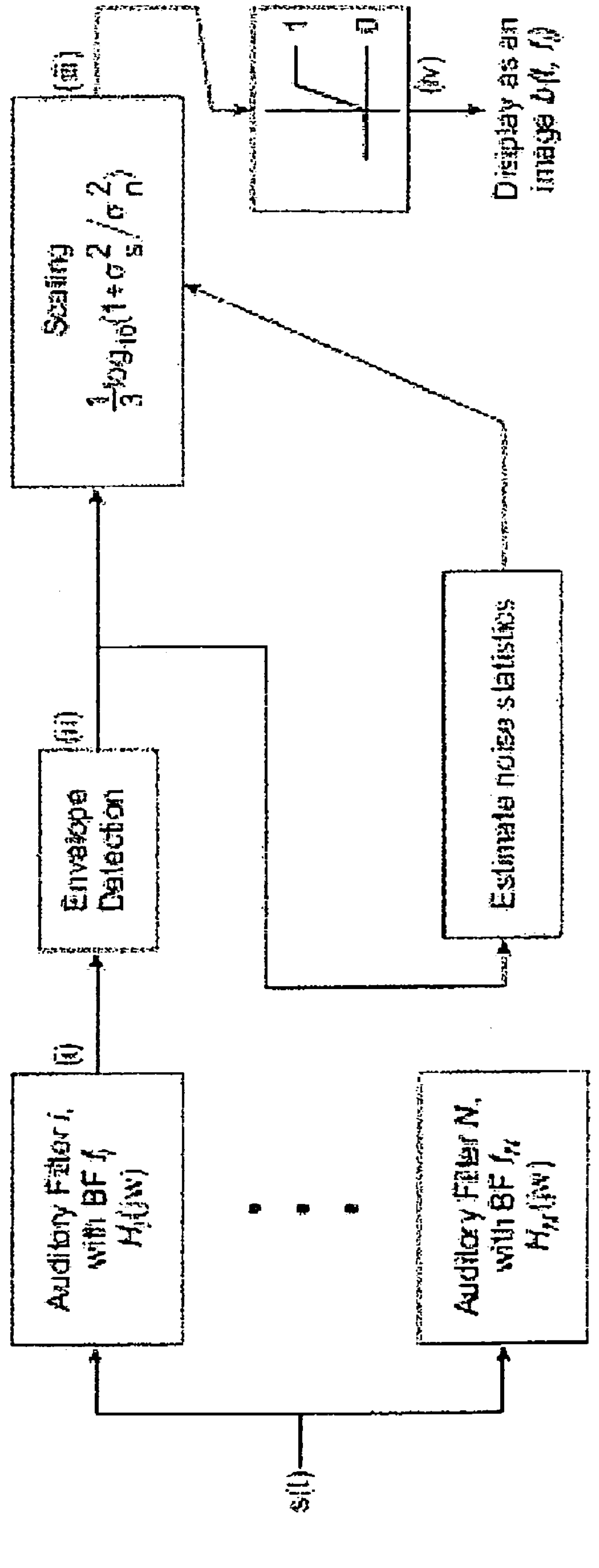
FIG. 1 is a simplified conventional diagram showing how the AI-gram is computed from a masked speech signal s(t)

The present invention is directed to identification of perceptual features. More particularly, the invention provides a system and method, for such identification, using one or more events related to coincidence between various frequency channels. Merely by way of example, the invention has been applied to phone detection. But it would be recognized that the invention has a much broader range of applicability.

1. Introduction

To understand speech robustness to masking noise, our approach includes collecting listeners' responses to syllables in noise and correlating their confusions with the utterances acoustic cues according to certain embodiments of the present invention. For example, by identifying the spectro-temporal features used by listeners to discriminate consonants in noise, we can prove the existence of these perceptual cues, or events. In another example, modifying events using signal processing techniques can lead to a new family of hearing aids, cochlear implants, and robust automatic speech recognition. The design of an automatic speech recognition (ASR) device based on human speech recognition would be a tremendous breakthrough to make speech recognizers robust to noise.

Our approach, according to certain embodiments of the present invention, aims at correlating the acoustic information, present in the noisy speech, to human listeners responses to the sounds. For example, human communication can be interpreted as an "information channel," where we are studying the receiver side, and trying to identify the ear's most robust to noise speech cues in noisy environments.

One might wonder why we study phonology (consonant-vowel sounds, noted CV) rather than language (context) according to certain embodiments of the present invention. While context effects are important when decoding natural language, human listeners are able to discriminate nonsense speech sounds in noise at SNRs below −16 dB SNR. This evidence is clear from an analysis of the confusion matrices (CM) of CV sounds. Such noise robustness appears to have been a major area of misunderstanding and heated debate.

For example, despite the importance of confusion matrices analysis in terms of production features such as voicing, place, or manner, little is known about the spectro-temporal information present in each waveform correlated to specific confusions. To gain access to the missing utterance waveforms for subsequent analysis and further explore the unknown effects of the noise spectrum, we have performed extensive analysis by correlating the audible speech information with the scores from two listening experiments denoted MN05 and UIUCs04.

According to certain embodiments, our goal is to find the common robust-to-noise features in the spectro-temporal domain. Certain previous studies pioneered the analysis of spectro-temporal cues discriminating consonants. Their goal was to study the acoustic properties of consonants /p/, /t/ and /k/ in different vowel contexts. One of their main results is the empirical establishment of a physical to perceptual map, derived from the presentation of synthetic CVs to human listeners. Their stimuli were based on a short noise burst (10 ms, 400 Hz bandwidth), representing the consonant, followed by artificial formant transitions composed of tones, simulating the vowel. They discovered that for each of these voiceless stops, the spectral position of the noise burst was vowel dependent. For example, this coarticulation was mostly visible for /p/ and /k/, with bursts above 3 kHz giving the percept of /t/ for all vowels contexts. A burst located at the second formant frequency or slightly above would create a percept of /k/, and below /p/. Consonant /t/ could therefore be considered less sensitive to coarticulation. But no information was provided about the robustness of their synthetic speech samples to masking noise, nor the importance of the presumed features relative to other cues present in natural speech. It has been shown by several studies that a sound can be perceptually characterized by finding the source of its robustness and confusions, by varying the SNR, to find, for example, the most necessary parts of the speech for identification.

According to certain embodiments of the present invention, we would like to find common perceptual robust-to-noise features across vowel contexts, the events, that may be instantiated and lead to different acoustic representations in the physical domain. For example, the research reported here focuses on correlating the confusion patterns (C P), defined as speech sounds CV confusions versus SNR, with the speech audibility information using an articulation index (AI) model described next. By collecting a lot of responses from many talkers and listeners, we have been able to build a large database of CP. We would like to explain normal hearing listeners confusions and identify the spectro-temporal nature of the perceptual features characterizing those sounds and thus relate the perceptual and physical domains according to some embodiments of the present invention. For example, we have taken the example of consonant /t/, and showed how we can reliably identify its primary robust-to-noise feature. In order to identify and label events, we would, for example, extract the necessary information from the listeners' confusions. In another example, we have shown that the main spectro-temporal cue defining the /t/ event is composed of across-frequency temporal coincidence, in the perceptual domain, represented by different acoustic properties in the physical domain, on an individual utterance basis, according to some embodiments of the present invention. According to some embodiments of the present invention, our observations support these coincidences as a basic element of the auditory object formation, the event being the main perceptual feature used across consonants and vowel contexts.

2. The Articulation Index

An Audibility Model

The articulation often is the score for nonsense sound. The articulation index (AI) usually is the foundation stone of speech perception and is the sufficient statistic of the articulation. Its basic concept is to quantify maximum entropy average phone scores based on the average critical band signal to noise ratio (SNR), in decibels re sensation level [dB-SL], scaled by the dynamic range of speech (30 dB).

It has been shown that the average phone score $P_c(AI)$ can be modeled as a function of the AI, the recognition error $e_{min}$ at AI=1, and the error $e_{chance}=1-1/16$ at chance performance (AI=0). This relationship is:

$$P_c(AI)=1-P_e=1-e_{chanc}e_{min}^{A1} \quad (1)$$

The AI formula has been extended to account for the peak-to-RMS ratio for the speech $r_k$ in each band, yielding Eq. (2). For example, parameter K=20 bands, referred to as articulation bands, has traditionally been used and determined empirically to have equal contribution to the score for consonant-vowel materials. The AI in each band (the specific AI) is noted $AI_k$:

$$AI_k = \min\left(\frac{1}{3}\log_{10}(1 + r_k^2 snr_k^2),\ 1\right) \quad (2)$$

where $snr_k$ is the SNR (i.e. the ratio of the RMS of the speech to the RMS of the noise) in the $k^{th}$ articulation band.

The total AI is therefore given by:

$$AI = \frac{1}{k}\sum_{k=1}^{k} AI_k \quad (3)$$

The Articulation Index has been the basis of many standards, and its long history and utility has been discussed in length.

The AI-gram, AI (t, f, SNR), is defined as the AI density as a function of time and frequency (or place, defined as the distance X along the basilar membrane), computed from a cochlear model, which is a linear filter bank with bandwidths equal to human critical bands, followed by a simple model of the auditory nerve.

FIG. 1 is a simplified conventional diagram showing how the AI-gram is computed from a masked speech signal s(t). The AI-gram, before the calculation of the AT, includes a conversion of the basilar membrane vibration to a neural firing rate, via an envelope detector.

As shown in FIG. 1, starting from a critical band filter bank, the envelope is determined, representing the mean rate of the neural firing pattern across the cochlear output. The speech+noise signal is scaled by the long-term average noise level in a manner equivalent to $1+\sigma_s^2/\sigma_n^2$. The scaled logarithm of that quantity yields the AI density AI(t, f, SNR). The audible speech modulations across frequency are stacked vertically to get a spectro-temporal representation in the form of the AI-gram as shown in FIG. 1. The AI-gram represents a simple perceptual model, and its output is assumed to be correlated with psychophysical experiments. When a speech signal is audible, its information is visible in different degrees of black on the AI-gram. If follows that all noise and inaudible sounds appear in white, due to the band normalization by the noise.

Figure 2:
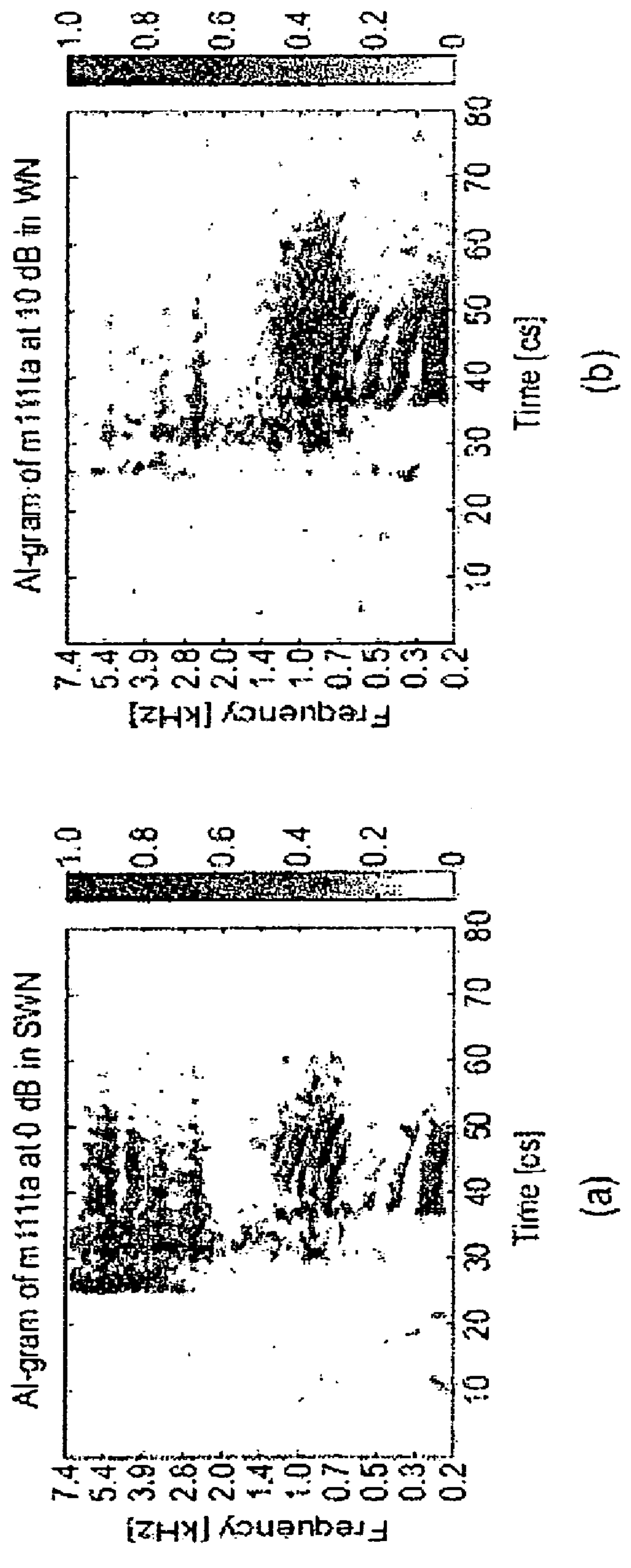
FIG. 2 shows simplified conventional AI-grams of the same utterance of /tɑ/ in speech-weighted noise (SWN) and white noise (WN) respectively.

FIG. 2 shows simplified conventional AI-grams of the same utterance of /tα/ in speech-weighted noise (SWN) and white noise (WN) respectively. Specifically, FIGS. 2(*a*) and (*b*) shows AI-grams of male speaker 111 speaking /ta/ in speech-weighted noise (SWN) at 0 dB SNR and white noise at 10 dB SNR respectively. The audible speech information is dark, the different levels representing the degree of audibility. The two different noises mask speech differently since they have different spectra. Speech-weighted noise mask low frequencies less than high frequencies, whereas one may clearly see the strong masking of white noise at high frequencies. The AI-gram is an important tool used to explain the differences in CP observed in many studies, and to connect the physical and perceptual domains.

3. Experiments

According to certain embodiments of the present invention, the purpose of the studies is to describe and draw results from previous experiments, and explain the obtained human CP responses $P_{h/s}$ (SNR) the AI audibility model, previously described. For example, we carry out an analysis of the robustness of consonant /t/, using a novel analysis tool, denoted the four-step method. In another example, we would like to give a global understanding of our methodology and point out observations that are important when analyzing phone confusions.

3.1 PA07 and MN05

This section describes the methods and results of two Miller-Nicely type experiments, denoted PA07 and MN05.

3.1.1 Methods

Here we define the global methodology used for these experiments. Experiment PA07 measured normal hearing listeners responses to 64 CV sounds (16 C×4V, spoken by 18 talkers), whereas MN05 included the subset of these CVs containing vowel /a/. For PA07, the masking noise was speech-weighted (SNR=[Q, 12, −2, −10, −16, −20, −22], Q for quiet), and white for MN05 (SNR=[Q, 12, 6, 0, −6, −12, −15, −18, −21]). All condition presented only once to our listeners, were randomized. The experiments were implemented with Matlab©, and the presentation program was run from a PC (Linux kernel 2.4, Mandrake 9) located outside an acoustic booth (Acoustic Systems model number 27930). Only the keyboard, monitor, headphones, and mouse were inside the booth. Subjects seating in the booth are presented with the speech files through the headphones (Sennheiser HD280 phones), and click on the corresponding file they heard on the user interface (GUI). To prevent any loud sound, the maximum pressure produced was limited to 80 dB sound pressure level (SPL) by an attenuator box located between the soundcard and the headphones. None of the subjects complained about the presentation level, and none asked for any adjustment when suggested. Subjects were young volunteers from the University of Illinois student and staff population. They had normal hearing (self-reported), and were native English speakers.

3.1.2 Confusion Patterns

Figure 3:
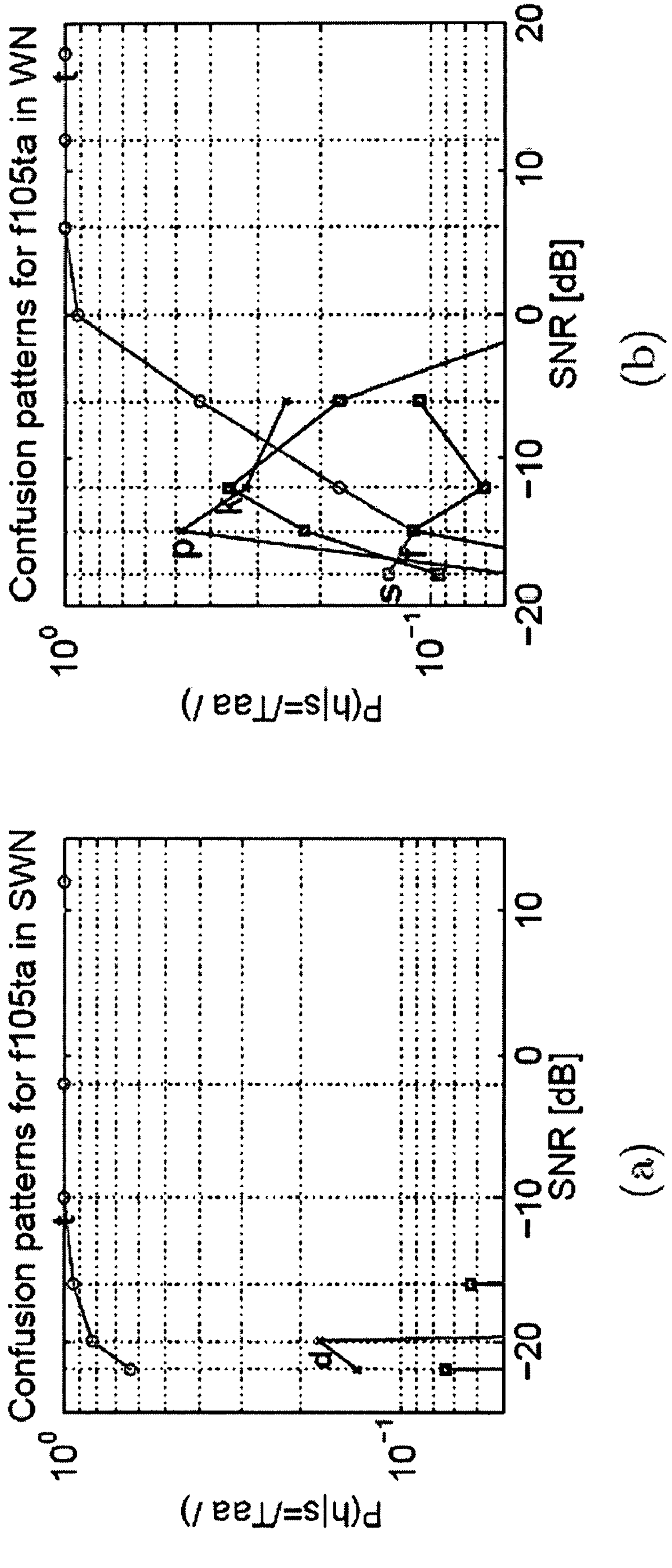
FIG. 3 shows simplified conventional CP plots for an individual utterance from UIUC-S04 and MN05.

Confusion patterns (a row of the CM vs. SNR), corresponding to a specific spoken utterance, provide the representation of the scores as a function of SNR. The scores can also be averaged on a CV basis, for all utterances of a same CV. FIG. 3 shows simplified conventional CP plots for an individual utterance from UIUC-S04 and MN05. Data for 14 listeners for PA07 and 24 for MN05 have been averaged.

Specifically, FIGS. 3(*a*) and (*b*) show confusion patterns for /tα/ spoken by female talker 105 in speech-weighted noise and white noise respectively. Note the significant robustness difference depending on the noise spectrum. In speech-weighted noise, /t/ is correctly identified down to 46 dB SNR whereas it starts decreasing at −2 dB in white noise. The confusions are also more significant in white noise, with the scores for /p/ and /k/ overcoming that of /t/ below −6 dB. We call this observation morphing. The maximum confusion score is denoted $SNR_g$. The reasons for this robustness difference depends on the audibility of the /t/ event, which will be analyzed in the next section.

Specifically, many observations can be noted from these plots according to certain embodiments of the present invention. First, as SNR is reduced, the target consonant error just starts to increase at the saturation threshold, denoted $SNR_s$. This robustness threshold, defined as the SNR at which the error drops below chance performance (93.75% point). For example, it is located at 2 dB SNR in white noise as shown in FIG. 3(*b*). This decrease happens much earlier for WN than in SWN, where the saturation threshold for this utterance is at −16 dB SNR.

Second, it is clear from FIG. 3 that the noise spectrum influences the confusions occurring below the confusion threshold. The confusion group of this /tα/ utterance in white noise (FIG. 3(*b*)) is /p/-/t/-/k/. The maximum confusion scores, denoted $SNR_g$, is located at −18 dB SNR for /p/, and −15 dB for /k/, with respective scores of 50 and 35%. In the case of speech weighted noise (FIG. 3(*a*)), /d/ is the only significant competitor, due to the extreme robustness ($SNR_s$=−16 dB) to this noise spectrum, with a low $SNR_g$=−20 dB. Therefore, the same utterance presents different robustness and confusion thresholds depending on the masking noise, due to the spectral support of what characterizes /t/. We shall further analyze this in the next section. The spectral emphasis of the masking noise will determine which confusions are likely to occur according to some embodiments of the present invention.

Third, as white noise is mixed with this /tα/, /t/ morphs to /p/, meaning that the probability of recognizing /t/ drops, while that of /p/ increases above the /t/ score. At an SNR of −9 dB, the /p/ confusion overcomes the target /t/ score. We call that morphing. As shown on the right CP plot of FIG. 3, the recognition of /p/ is maximum ($P_{/p/}$=50%) at $SNR_g$=−16 dB, that of /k/ peaks at 35% at −12 dB, where the score for /t/ is about 10%.

Fourth, listening experiments show that when the scores for consonants of a confusion group are similar, listeners can prime between these phones. For example, priming is defined as the ability to mentally select the consonant heard, by making a conscious choice between several possibilities having neighboring scores. As a result of pruning, a listener will randomly chose one of the three consonants. Listeners may have an individual bias toward one or the other sound, causing scores differences. For example, the average listener randomly primes between /t/ and /p/ and /k/ at around −10 dB SNR, whereas they typically have a bias for /p/ at −16 dB SNR, and for /t/ above −5 dB. The SNR range for which priming takes place is listener dependent; the CP presented here are averaged across listeners and, therefore, are representative of an average priming range.

Based on our studies, priming occurs when invariant features, shared by consonants of a confusion group, are at the threshold of being audible, and when one distinguishing feature is masked.

In summary, four major observations may be drawn from an analysis of many CP such as those of FIG. 3, which apply for our consonant studies: (i) robustness variability and (ii) confusion group variability across noise spectra, (iii) morphing, and (iv) priming according to certain embodiments of the present invention. For example, we conclude that each utterance presents different saturation thresholds, different confusion groups, morphs or not, and may be subject to priming in some SNR range, depending on the masking noise and the consonant according to certain embodiments of the present invention. In another example, across utterances, we quantitatively relate the confusions patterns and robustness to the audible cues at a given SNR, as exampled in the above discussion. Finding this relation leads us to identify the acoustic features that map to the "perceptual space." Using the four-step method, described in the next section, we will demonstrate that events are common across utterances of a particular consonant, whereas the acoustic correlates of the events, meaning the spectro-temporal and energetic properties, depend on the SNR, the noise spectrum, and the utterance according to some embodiments.

3.2 Four-Step Method to Identify Events

According to certain embodiments of the present invention, our four-step method is an analysis that uses the perceptual models described above and correlates them to the CP. It lead to the development of an event-gram, an extension of the AI-gram, and uses human confusion responses to identify the relevant parts of speech. For example, we used the four-step method to draw conclusions about the /t/ event, but this technique may be extended to other consonants. Here, as an example, we identify and analyze the spectral support of the primary /t/ perceptual feature, for two /tɛ/ utterances in speech-weighted noise, spoken by different talkers.

Figure 4:
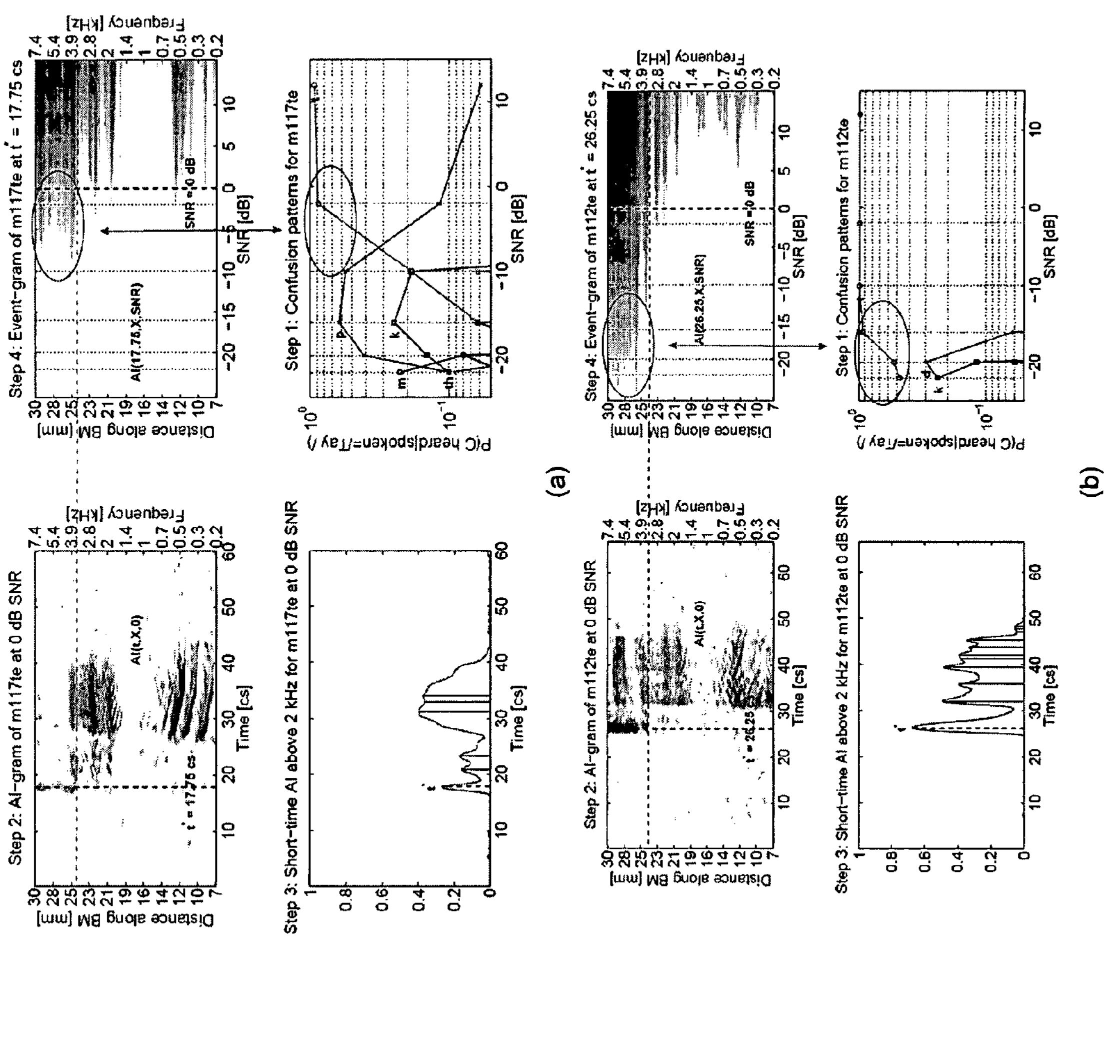
FIG. 4 shows simplified comparisons between a "weak" and a "robust" /tɛ/ according to an embodiment of the present invention.

FIG. 4 shows simplified comparisons between a "weak" and a "robust" /tɛ/ according to an embodiment of the present invention. These diagrams are merely examples, which should not unduly limit the scope of the claims. One of ordinary skill in the art would recognize many variations, alternatives, and modifications.

According to certain embodiments, step 1 corresponds to the CP (bottom right), step 2 to the AI-gram at 0 dB SNR in speech-weighted noise, step 3 to the mean AI above 2 kHz where the local maximum t* in the burst is identified, leading to step 4, the event gram (vertical slice through AI-grams at t*). Note that in the same masking noise, these utterances behave differently and present different competitors. Utterance m117te morphs to /pɛ/. Many of these differences can be explained by the AI-gram (the audibility model), and more specifically by the event-gram, showing in each case the audible /t/ burst information as a function of SNR. The strength of the /t/ burst, and therefore its robustness to noise, is precisely correlated with the human responses (encircled). This leads to the conclusion that this across-frequency onset transient, above 2 kHz, is the primary /t/ event according to certain embodiments.

Specifically, FIG. 4(*a*) shows simplified analysis of sound /tɛ/ spoken by male talker 117 in speech-weighted noise. This utterance is not very robust to noise, since the /t/ recognition starts to decrease at −2 dB SNR. Identifying t*, time of the burst maximum at 0 dB SNR in the AI-gram (top left), and its mean in the 2-8 kHz range (bottom left), leads to the event-gram (top right). For example, this representation of the audible phone /t/ burst information at time t* is highly correlated with the CP: when the burst information becomes inaudible (white on the AI-gram), /t/ score decreases, as indicated by the ellipses.

FIG. 4(*b*) shows simplified analysis of sound /tɛ/ spoken by male talker 112 in speech-weighted noise. Unlike the case of m117te, this utterance is robust to speech-weighted nose and identified down to −16 dB SNR. Again, the burst information displayed on the event-gram (top right) is related to the CP, accounting for the robustness of consonant /t/ according to some embodiments of the present invention.

3.2.1 Step 1: CP and Robustness

In one embodiment, step 1 of our four-step analysis includes the collection of confusion patterns, as described in the previous section. Similar observations can be made when examining the bottom right panels of FIGS. 4(*a*) and 4(*b*).

For male talker 117 speaking /tɛ/ (FIG. 4(*a*), bottom right panel), the saturation threshold is −6 dB SNR forming a /p/, /t/, /k/ confusion group, whereas $SNR_g$ is at ≈−20 dB SNR for talker 112 (FIG. 4(*b*), bottom right panel). This weaker /t/ morphs to /p/ (FIG. 4(*a*)), the recognition of /p/ is maximum ($P_{/p/}$=60%) at an SNR of −16 dB, where the score for /t/ is 6%, after the start of decrease (ellipsed). Morphing not only occurs in white noise (FIG. 3) but also in speech-weighted noise for this weaker /tɛ/ sound. Confusion patterns and robustness vary dramatically across utterances of a given CV masked by the same noise: unlike for talker m117, /te/ spoken by talker m112 does not morph to /p/ or /k/, and its score is higher (FIG. 4(*b*), bottom right panel). For this utterance, /t/ (solid line) was accurately identified down to −18 dB SNR (encircled), and was still well above chance performance (1/16) at −22 dB. Its main competitors /d/ and /k/ have lower score, and only appear at −18 dB SNR.

It is clear that these two /tɛ/ sounds are dramatically different. Such utterance differences may be determined by the addition of masking noise. There is confusion pattern variability not only across noise spectra, but also within a masking noise category (e.g., WN vs. SWN). These two /tɛ/s are an example of utterance variability, as shown by the analysis of Step 1: two sounds are heard as the same in quiet, but they are heard differently as the noise intensity is increased. The next section will detail the physical properties of consonant /t/ in order to relate spectro-temporal features to the score using our audibility model.

3.2.2 Step 2 and 3: Utilization of a Perceptual Model

For talker 117, FIG. 4(*a*) (top left panel) at 0 dB SNR, we observe that the high-frequency burst, having a sharp energy onset, stretches from 2.8 kHz to 7.4 kHz, and runs in time from 16-18 cs (a duration of 20 ms). According to the CP previously discussed (FIG. 4(*a*), bottom right panel), at 0 dB SNR consonant /t/ is recognized 88% of the time. The burst for talker 112 has higher intensity and spreads from 3 kHz up, as shown of the AI-gram for this utterance (FIG. 4(*b*), top left panel), which results in a 100% recognition at and above about −10 dB SNR.

These observations lead us to Step 3, the integration of the AI-gram over frequency (bottom right panels of FIGS. 4(*a*) and (*b*)) according to certain embodiments of the present invention. For example, one obtains a representation of the average audible speech information over a particular frequency range Δf as a function of time, denoted the short-time AI, ai(t). The traditional AI is the area under the overall frequency range curve at time t. In this particular case, ai(t) is computed in the 2-8 kHz bands, corresponding to the high-frequency /t/ burst of noise. The first maximum, ai(t*) (vertical dashed line on the top and bottom left panels of FIGS. 4(*a*) and 4(*b*)), is an indicator of the audibility of the consonant. The frequency content has been collapsed, and t* indicates the time of the relevant perceptual information for /t/.

3.2.3 Step 4: The Event-Gram

The identification of t* allows Step 4 of our correlation analysis according to some embodiments of the present invention. For example, the top right panels of FIGS. 4(*a*) and (*b*) represent the event-grams for the two utterances. The event-gram, AI(t*, X, SNR), is defined as a cochlear place (or frequency, via Greenwood's cochlear map) versus SNR slice at one instant of time. The event-gram is, for example, the link between the CP and the AI-gram. The event-gram represents the AI density as a function of SNR, at a given time t* (here previously determined in Step 3) according to an embodiment of the present invention. For example, if several AI-grams were stacked on top of each other, at different SNRs, the event-gram can be viewed as a vertical slice through such a stack. Namely, the event-grams displayed in the top right panels of FIGS. 4(*a*) and (*b*) are plotted at t*, characteristic of the /t/ burst. A horizontal dashed line, from the bottom of the burst on the AI-gram, to the bottom of the burst on the event-gram at SNR=0 dB, establishes, for example, a visual link between the two plots.

According to an embodiment of the present invention, the significant result visible on the event-gram is that for the two utterances, the event-gram is correlated with the average normal listener score, as seen in the circles linked by a double arrow. Indeed, for utterance 117te, the recognition of consonant /t/ starts to drop, at −2 dB SNR, when the burst above 3 kHz is completely masked by the noise (top right panel of FIG. 4(*a*)). On the event-gram, below −2 dB SNR (circle), one can note that the energy of the burst at t* decreases, and the burst becomes inaudible (white). A similar relation is seen for utterance 112, but since the energy of the burst is much higher, the /t/ recognition only starts to fall at −15 dB SNR, at which point the energy above 3 kHz become sparse and decreases, as seen in the top right panel of FIG. 4(*b*) and highlighted by the circles. A systematic quantification of this correlation for a large numbers of consonants will be described in the next section.

According to an embodiment of the present invention, there is a correlation in this example between the variable /t/ confusions and the score for /t/ (step 1, bottom right panel of FIGS. 4(*a*) and (*b*)), the strength of the /t/ burst in the AI-gram (step 2, top left panels), the short-time AI value (step 3, bottom left panels), all quantifying the event-gram (step 4, top right panels). This relation generalizes to numerous other /t/ examples and has been here demonstrated for two /tɛ/ sounds. Because these panels are correlated with the human score, the burst constitutes our model of the perceptual cue, the event, upon which listeners rely to identify consonant /t/ in noise according to some embodiments of the present invention.

In the next section, we analyze the effect of the noise spectrum on the perceptual relevance of the /t/ burst in noise, to account for the differences previously observed across noise spectra.

3.3 Discussion

3.3.1. Effect of the Noise Samples

Figure 5:
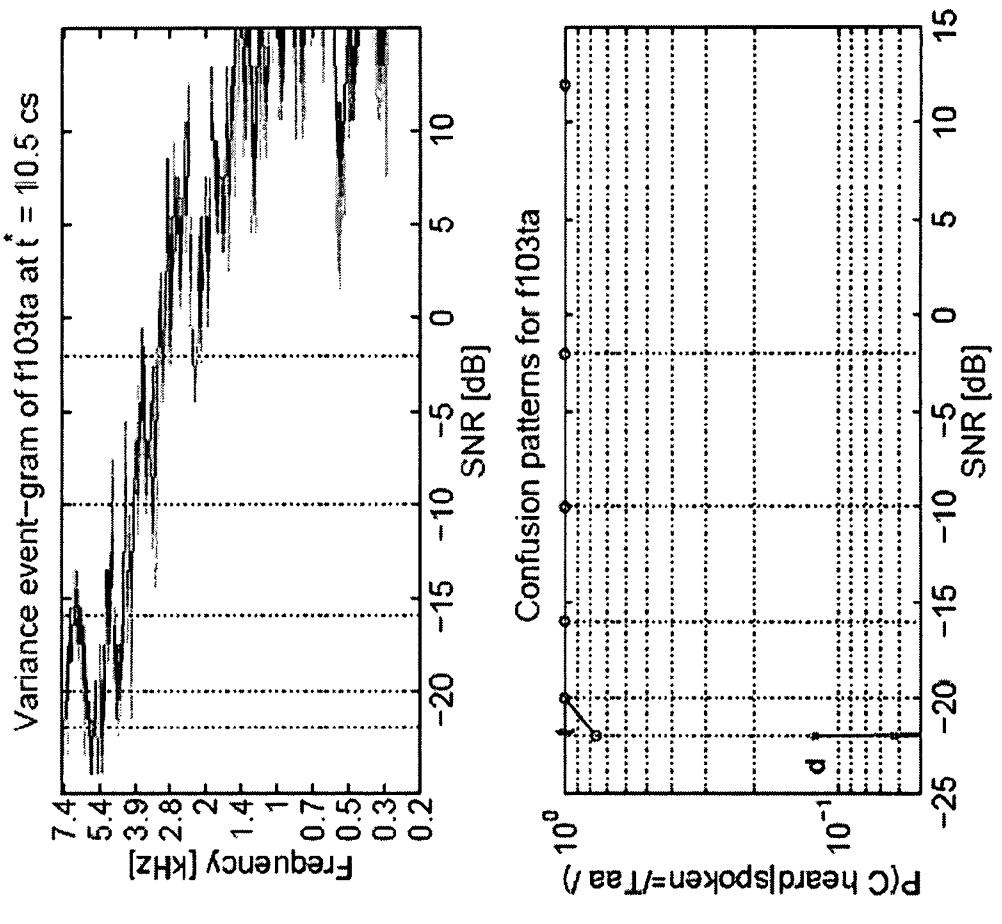
FIG. 5 shows simplified diagrams for variance event-gram computed by taking event-grams of a /tɑ/ utterance for 10 different noise samples according to an embodiment of the present invention.

FIG. 5 shows simplified diagrams for variance event-gram computed by taking event-grams of a /tɑ/ utterance for 10 different noise samples in SWN (PA07) according to an embodiment of the present invention. These diagrams are merely examples, which should not unduly limit the scope of the claims. One of ordinary skill in the art would recognize many variations, alternatives, and modifications. We can see that all the variance is, for example, located on the edges of the audible speech energy, located between regions of high audibility and regions of noise. However, the spread is thin, showing that the use of different noise samples should not significantly impact perceptual scores according to some embodiments of the present invention.

Specifically, one could wonder about the effect of the variability of the noise for each presentation on the event-gram. At least one of our experiments has been designed such that a new noise sample was used for each presentation, so that listeners would not hear the same sound mixed with a different noise, even if presented at the same SNR. We have analyzed the variance when using different noise samples having the same spectrum. Therefore, we have computed event-grams for 10 different noise samples, and calculated the variance as shown on FIG. 5 for utterance f103ta in SWN. We can observe that, for certain embodiments of the present invention, regions of high audibility are white (high SNRs), as well as regions where the noise has a strong masking effect (low SNRs). The noticeable variance is seen at the limit of audibility. The thickness of the line is a measure of the trial variance. Such a small spread of the line indicates that using a new noise on every trial is likely not to impact the scores of our psychophysical experiment, and the correlation between noise and speech is unlikely to add features improving the scores.

3.3.2 Relating CP and Audibility for /t/

We have collected normal hearing listeners responses to nonsense CV sounds in noise and related them to the audible speech spectro-temporal information to find the robust-to-noise features. Several features of CP are defined, such as morphing, priming, and utterance heterogeneity in robustness according to some embodiments of the present invention. For example, the identification of a saturation threshold $SNR_g$, located at the 93.75% point is a quantitative measure of an utterance robustness in a specific noise spectrum. The natural utterance variability, causing utterances of a same phone category to behave differently when mixed with noise, could now be quantified by this robustness threshold. The existence of morphing clearly demonstrates that noise can mask an essential feature for the recognition of a sound, leading to consistent confusions among our subjects. However such morphing is not ubiquitous, as it depends on the type of masking noise. Different morphs are observed in various noise spectra. Morphing demonstrates that consonants are not uniquely characterized by independent features, but that they share common cues that are weighted differently in perceptual space according to some embodiments of the present invention. This conclusion is also supported by CP plots for /k/ and /p/ utterances, showing a well defined /p/-/t/-/k/ confusion group structure in white noise. Therefore, it appears that /t/, /p/ and /k/ share common perceptual features. The /t/ event is more easily masked by WN than SWN, and the usual /k/-/p/ confusion for /t/ in WN demonstrates that when the /t/ burst is masked the remaining features are shared by all three voiceless stop consonants. When the primary /t/ event is masked at high SNRs in SWN (as exampled in FIG. 4(*a*)), we do not see such strong /p/-/t/-/k/ confusion group. It is likely that the common features shared by this group are masked by speech weighted noise, due to their localization in frequency, whereas the /t/ burst itself is usually robust in SWN. For hearing impaired subjects with an increased sensitivity to noise (called an SNR-loss, when an ear needs a larger SNR for the same speech score), their score for utterance m112te should typically be higher than that of utterance m117te, at a given SNR. We shall show in section 4 that this common feature hypothesis is also supported by temporal truncation experiments. It is shown that confusions take place when the acoustic features for the primary /t/ event are inaudible, due to noise or truncation, and that the remaining cues are part of what perceptually characterizes competitors /p/ and /k/, according to certain embodiments of the present invention.

Using a four-step method analysis, we have found that the discrimination of /t/ from its competitors is due to the robustness of /t/ event, the sharp onset burst being its physical representation. For example, robustness and CP are not utterance dependant. Each instance of the /t/ event presents different characteristics. In one embodiment, the event itself is invariant for each consonant, as seen on FIG. 4. For example, we have found a single relation between the masking of the burst on the event-gram and human responses, independent of noise spectrum. White noise more actively masks high frequencies, accounting for the decrease of the /t/ at high SNRs recognition as compared to speech-weighted noise. Once the burst is masked, the /t/ score drops below 100%. This supports that the acoustic representations in the physical domain of the perceptual features are not invariant, but that the perceptual features themselves (events) remain invariant, since they characterize the robustness of a given consonant in the perceptual domain according to certain embodiments. For example, we want to verify here that the burst accounts for the robustness of /t/, therefore being the physical representation of what perceptually characterizes /t/ (the event), and having various physical properties across utterances. The unknown mapping from acoustics to event space is at least part of what we have demonstrated in our research.

Figure 6:
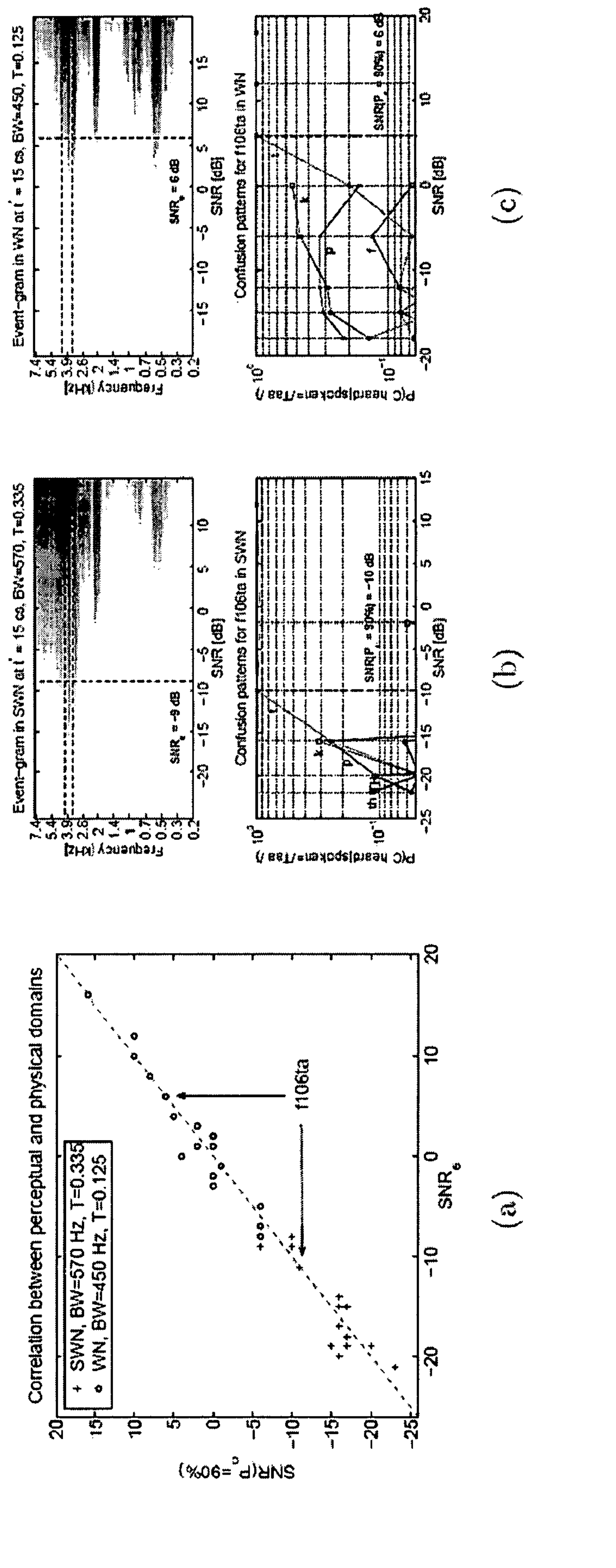
FIG. 6 shows simplified diagrams for correlation between perceptual and physical domains according to an embodiment of the present invention.

FIG. 6 shows simplified diagrams for correlation between perceptual and physical domains according to an embodiment of the present invention. These diagrams are merely examples, which should not unduly limit the scope of the claims. One of ordinary skill in the art would recognize many variations, alternatives, and modifications.

FIG. 6(*a*) is a scatter plot of the event-gram thresholds $SNR_e$ above 2 kHz, computed for the optimal burst bandwidth B, having an AI density greater than the optimal threshold T, compared to the SNR of 90% score. Utterances in SWN (+) are more robust than in WN (o), accounting for the large spread in SNR. We can see that most utterances are close from the 45-degree line, showing the high correlation between the AI-gram audibility model (middle pane), and the event-gram (right pane) according an embodiment. The detection of the event-gram threshold, SNR, is shown on the event gram in SWN (top pane of FIG. 6(*b*)) and WN (top pane of FIG. 6(*c*)), between the two horizontal lines, for f106ta, and placed above their corresponding CP. $SNR_e$ is located at the lowest SNR where there is continuous energy above 2 kHz, spread in frequency with a width of B above AI threshold T. We can notice the effect of the noise spectrum on the event-gram, accounting for the difference in robustness between WN and SWN.

Specifically, in order to further quantify the correlation between the audible speech information as displayed on the event-gram, and the perceptual information given by our listeners in a quantitative manner, we have correlated event-gram thresholds, denoted $SNR_e$, with the 90% score SNR, denoted $SNR(P_c{=}90\%)$. The event-gram thresholds are computed above 2 kHz, for a given set of parameters: the bandwidth, B, and AI density threshold T. For example, the threshold correspond to the lowest SNR at which there is continuous speech information above threshold T, and spread out in frequency with bandwidth B, assumed to be relevant for the /t/ recognition as observed using the four-step method. Such correlations are shown in FIG. 6(*a*), and have been obtained for a different set of optimal parameters (computing by minimizing the mean square error) in the two experiments, showing that the optimized parameters depend on the noise spectrum. Optimized parameters are B 570 Hz in SWN, for T 0.335, and B=450 Hz for T 0.125 in WN. Bandwidths have been tested as low as 5 Hz steps when close to the minimum mean square error, and thresholds in steps of 0.005. The 14 /α/ utterances in PA07 are present in MN05, therefore each sound common to both experiments appears twice on the scatter plot. Scatters for MN05 (in WN), are at higher SNRs than for PA07 (in SWN), due to the strong masking of the /t/ burst in white noise, leading to higher $SNR_e$ and $SNR(P_c{=}90\%)$. We can see that most utterances are close from the 45-degree line, proving that our AI-gram audibility model, and the event-gram are a good predictor of the average normal listener score, demonstrated at least here in the case of /t/. The 120 Hz difference between optimal bandwidths for WN and SWN does not seem to be significant. Additionally, an intermediate value for both noise spectra can be identified.

For example, the difference in optimal AI thresholds T is likely due to the spectral emphasis of the each noise. The lower value obtained in WN could also be the result of other cues at lower frequencies, contributing to the score when the burst get weak. However, it is likely that applying T for WN in the SWN case would only lead to a decrease in $SNR_e$ of a few dB. Additionally, the optimal parameters may be identified to fully characterize the correlation between the scores and the event-gram model.

As an example, FIG. 6(*b*) shows an event-gram in SWN, for utterance f106ta, with the optimal bandwidth between the two horizontal lines leading to the identification of $SNR_e$. Below are the CP, where SNR $(P_c{=}90\%){=}-10$ dB is noted (thresholds are chosen in 1 dB steps, and the closest SNR integer above 90% is chosen). FIG. 6(*c*) shows event-gram and CP for the same utterance in WN. The points corresponding to utterance f106ta are noted by arrows. Regardless of the noise type, we can see on the event-grams the relation between the audibility of the 2-8 kHz range at t* (in dark) and the correct recognition of /t/, even if thresholds are lower in SWN than WN. More specifically, the strong masking of white noise at high frequencies accounts for the early loss of the /t/ audibility as compared to speech-weighted noise, having a weaker masking effect in this range. We can conclude that the burst, as an high-frequency coinciding onset, is the main event accounting for the robustness of consonant /t/ independently of the noise spectrum according to an embodiment of the present invention. For example, it presents different physical properties depending on the masker spectrum, but its audibility is strongly related to human responses in both cases.

To further verify the conclusions of the four-step method regarding the /t/ burst event, we have run a psychophysical experiment where the /t/ burst would be truncated, and study the resulting responses, under less noisy conditions. We hypothesize that since the /t/ burst is the most robust-to-noise event, it is the strongest feature cueing the /t/ percept, even at higher SNRs. The truncation experiment will therefore remove this crucial /t/ information.

4. Truncation Experiment

We have strengthened our conclusions drawn from FIG. 4 based on a confusion patterns and the event-gram analysis. We have truncated CV sounds in 5 ms steps and studied the resulting morphs. At least one of our goals is to answer a fundamental research question raised by the four-step analysis of /t/: can the truncation of /t/ cause a morph to /p/, implying that the /t/ event is prefixed to consonant /p/, and therefore that they share common features? This conclusion would be in agreement with our observation that some /t/ strongly morph to /p/ when the energy at high frequencies around t* is masked by the noise.

4.1 Methods

Two SNR conditions, 0 and 12 dB SNR, were used in SWN. The noise spectrum was the same as used in PA07. The listeners could choose among 22 possible consonants responses. The subjects did not express a need to add more response choices. Ten subjects participated in the experiment.

4.1.1 Stimuli

The tested CVs were, for example, /tɑ/, /pɑ/, /sɑ/, /zɑ/, and /ʃɑ/ from different talkers for a total of 60 utterances. The beginning of the consonant and the beginning of the vowel were hand labeled. The truncations were generated every 5 ms, including a no-truncation condition and a total truncation condition. One half second of noise was prepended to the truncated CVs. The truncation was ramped with a Hamming window of 5 ms, to avoid artifacts due an abrupt onset. We report /t/ results here as an example.

4.2 Results

An important conclusion of the /tɑ/ truncation experiment is the strong morph obtained for all of our stimuli, when less than 30 ms of the burst are truncated. Truncation times are relative to the onset of the consonant. When presented with our truncated /tɑ/ sounds, listeners reported hearing mostly /p/. Some other competitors, such as /k/ or /h/ were occasionally reported, but with much lower average scores than /p/.

Two main trends can be observed. Four out of ten utterances followed a hierarchical /t/ /p/ /b/ morphing pattern, denoted group 1. The consonant was first identified as /t/ for truncation times less than 30 ms, then /p/ was reported over a period spreading from 30 ms to 11.0 ms (an extreme case), to finally being reported as /b/. Results for group 1 are shown in FIG. 7.

Figure 7:
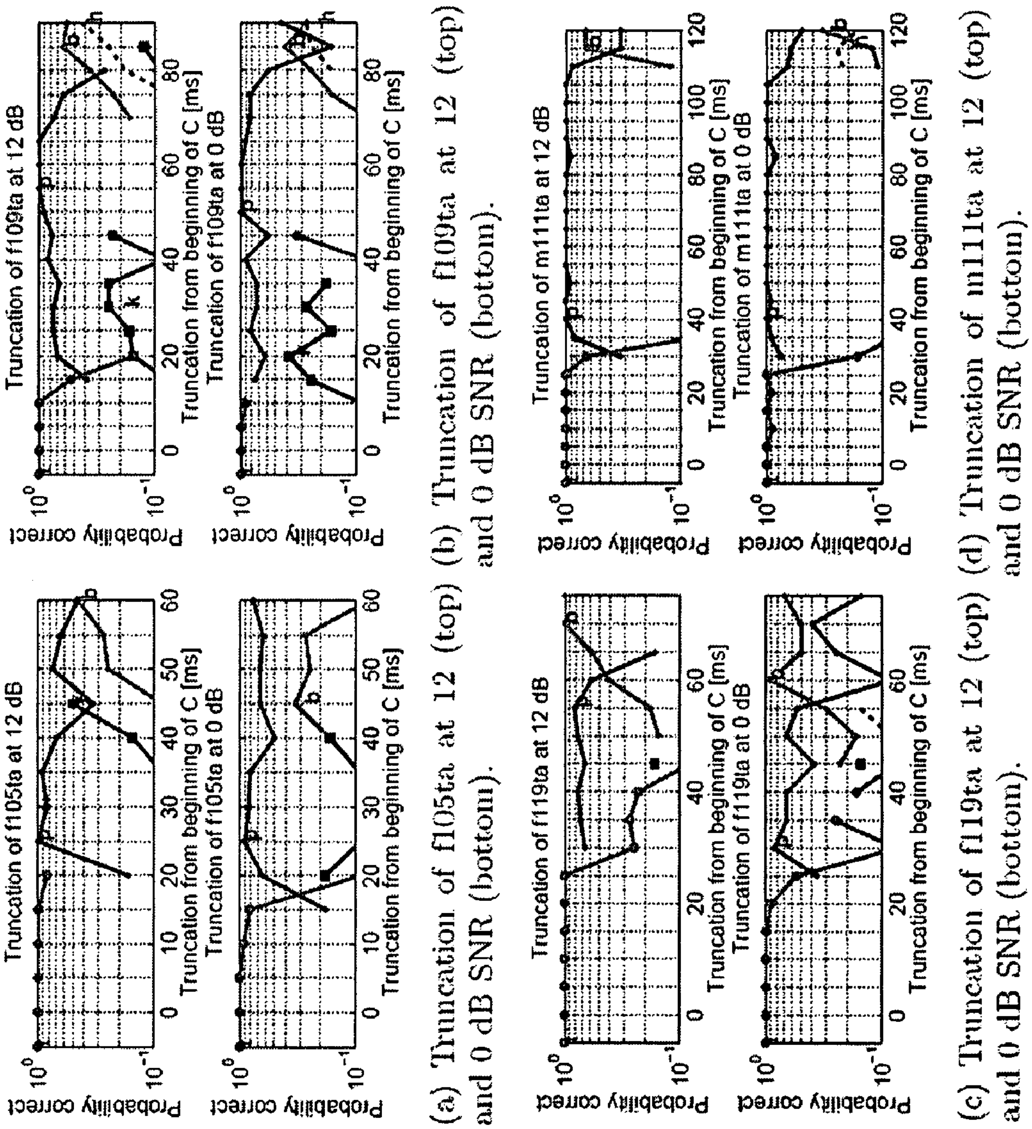
FIG. 7 shows simplified typical utterances from one group, which morph from /t/-/p/-/b/ according to an embodiment of the present invention.

FIG. 7 shows simplified typical utterances from group 1, which morph from /t/-/p/-/b/ according to an embodiment of the present invention. These diagrams are merely examples, which should not unduly limit the scope of the claims. One of ordinary skill in the art would recognize many variations, alternatives, and modifications. For each panel, the top plot represents responses at 12 dB, and the lower at 0 dB SNR. There is no significant SNR effect for sounds of group 1.

According to one embodiment, FIG. 7 shows the nature of the confusions when the utterances, described in the titles of the panels, are truncated from the start of the sounds. This confirms the nature of the events locations in time, and confirms the event-gram analysis of FIG. 6. According to another embodiment, as shown in FIG. 7, there is significant variability in the cross-over truncation times, corresponding to the time at which the target and the morph scores overlap. For example, this is due to the natural variability in the /t/ burst duration. The change in SNR from 12 to 0 dB had little impact on the scores, as discussed below. In another example, the second trend can be defined as utterances that morph to /p/, but are also confused with /h/ or /k/. Five out of ten utterances are in this group, denoted Group 2, and are shown in FIGS. 8 and 9.

Figure 8:
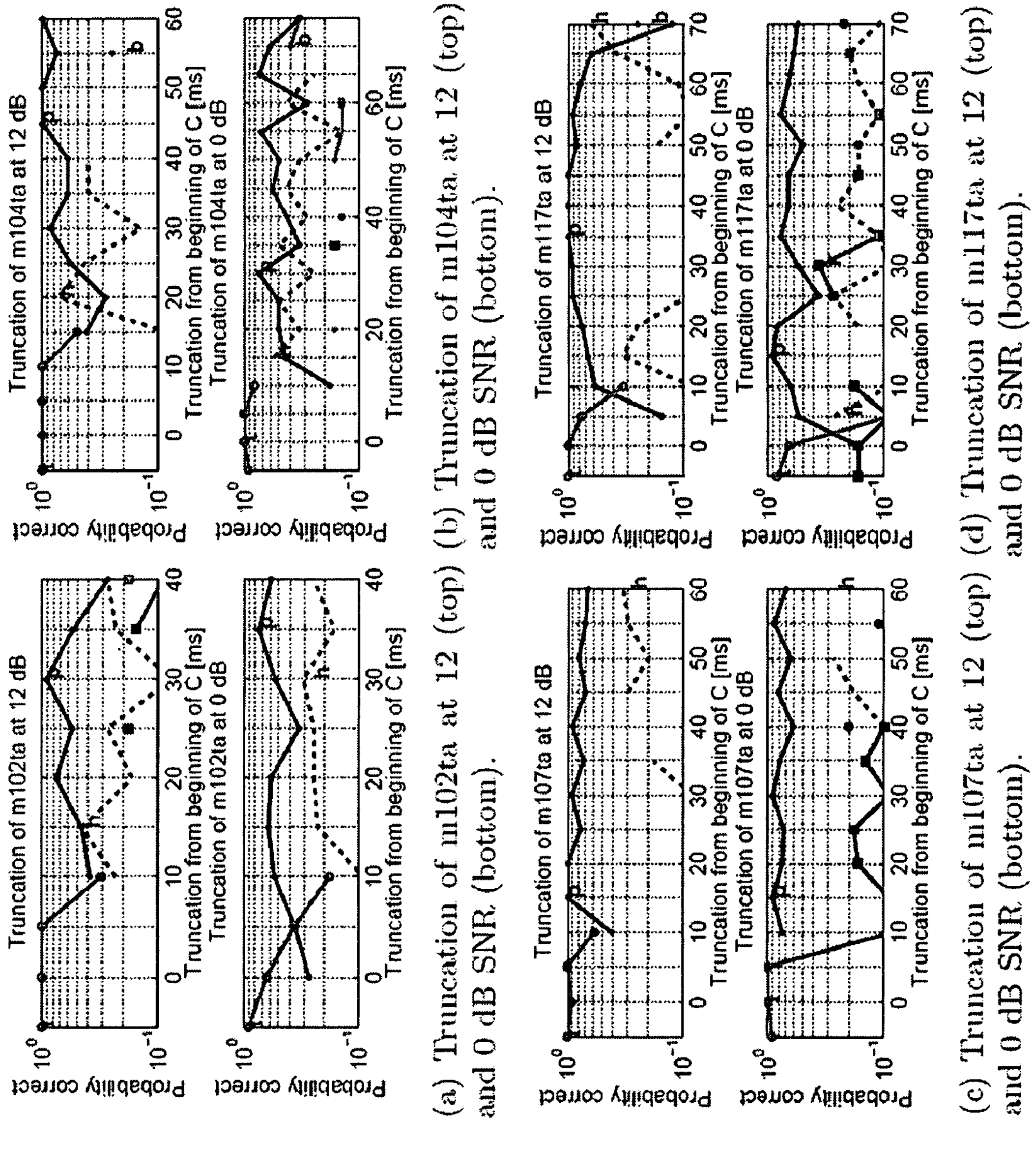
FIG. 8 shows simplified typical utterances from another group according to an embodiment of the present invention.

FIG. 8 shows simplified typical utterances from group 2 according to an embodiment of the present invention. These diagrams are merely examples, which should not unduly limit the scope of the claims. One of ordinary skill in the art would recognize many variations, alternatives, and modifications. Consonant /h/ strongly competes with /p/ (top), along with /k/ (bottom). For the top right and left panels, increasing the noise to 0 dB SNR causes an increase in the /h/ confusion in the /p/ morph range. For the two bottom utterances, decreasing the SNR causes a /k/ confusion that was nonexistent at 12 dB, equating the scores for competitors /k/ and /h/.

Figure 9:
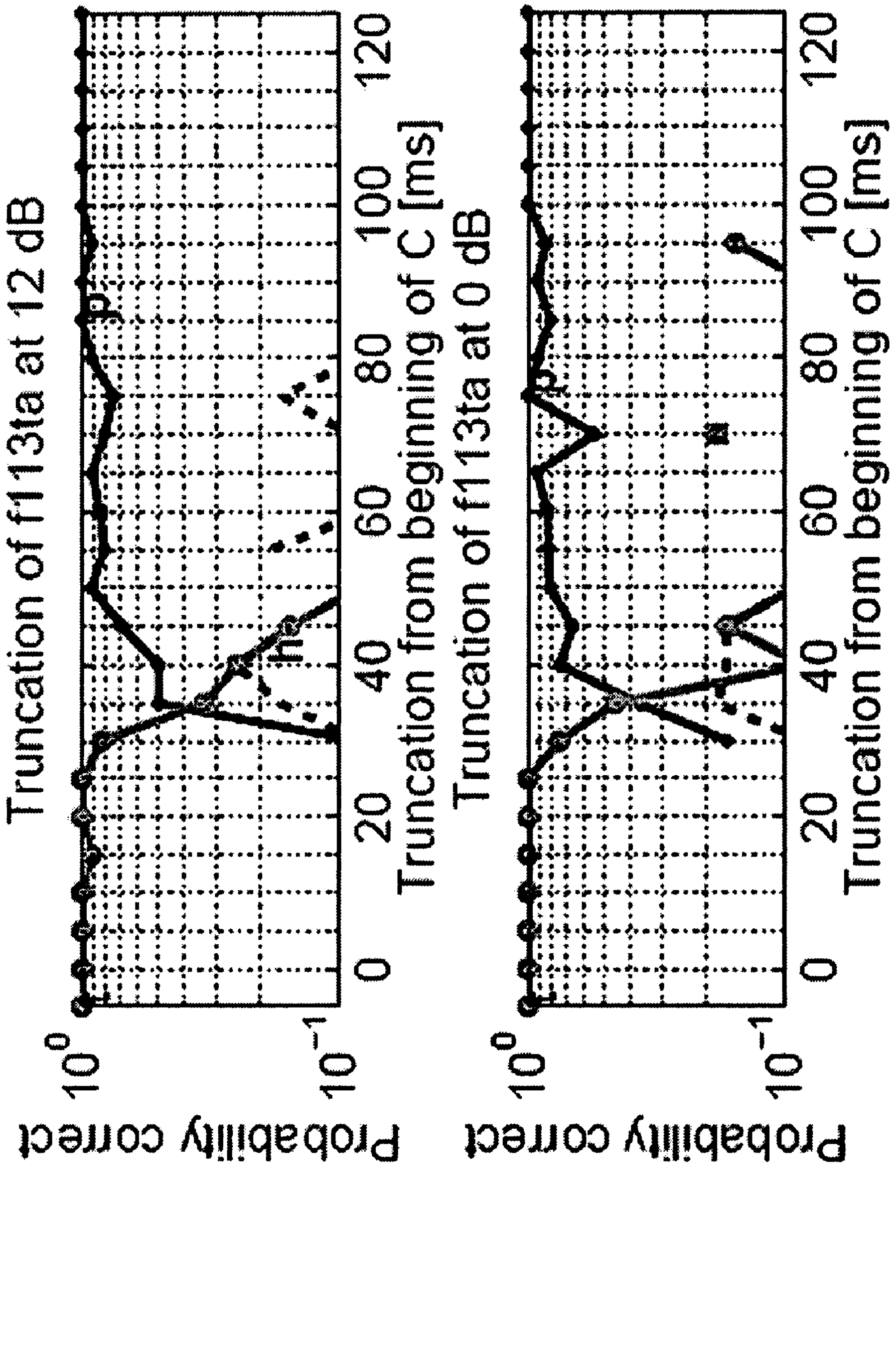
FIG. 9 shows simplified truncation according to an embodiment of the present invention.

FIG. 9 shows simplified truncation of f113ta at 12 (top) and 0 dB SNR (bottom) according to an embodiment of the present invention. These diagrams are merely examples, which should not unduly limit the scope of the claims. One of ordinary skill in the art would recognize many variations, alternatives, and modifications. Consonant /t/ morphs to /p/, which is slightly confused with /h/. There is no significant SNR effect.

As shown in FIGS. 8 and 9, the /h/ confusion is represented by a dashed line, and is stronger for the two top utterances, m102ta and m104ta (FIGS. 8(*a*) and (*b*)). A decrease in SNR from 12 to 0 dB caused a small increase in the /h/ score, almost bringing scores to chance performance (e.g. 50%) between those two consonants for the top two utterances. The two lower panels show results for talkers m107 and m117, a decrease in SNR causes a /k/ confusion as strong as the /h/ confusion, which differs from the 12 dB case where competitor /k/ was not reported. Finally, the truncation of utterance f113ta (FIG. 9) shows a weak /h/ confusion to the /p/ morph, not significantly affected by an SNR change.

A noticeable difference between group 2 and group 1 is the absence of /b/ as a strong competitor. According to certain embodiment, this discrepancy can be due to a lack of greater truncation conditions. Utterances m104ta, m117ta (FIGS. 8(*b*) and (*d*)) show weak /b/ confusions at the last truncation time tested.

We notice that both for group 1 and 2 the onset of the decrease of the /t/ recognition varies with increased SNR. In the 0 dB case, the score for /t/ drops 5 ms earlier than in the 12 dB case in most cases. This can be attributed to, for example, the masking of each side of the burst energy, making them inaudible, and impossible to be used as a strong onset cue. This energy is weaker than around t*, where the /t/ burst energy has its maximum. One dramatic example of this SNR effect is shown in FIG. 7(*d*).

The pattern for the truncation of utterance m120ta was different from the other 9 utterances included in the experiment. First, the score for /t/ did not decrease significantly after 30 ms of truncation. Second, /k/ confusions were present at 12 but not at 0 dB SNR, causing the /p/ score to reach 100% only at 0 dB. Third, the effect of SNR was stronger.

Figure 10:
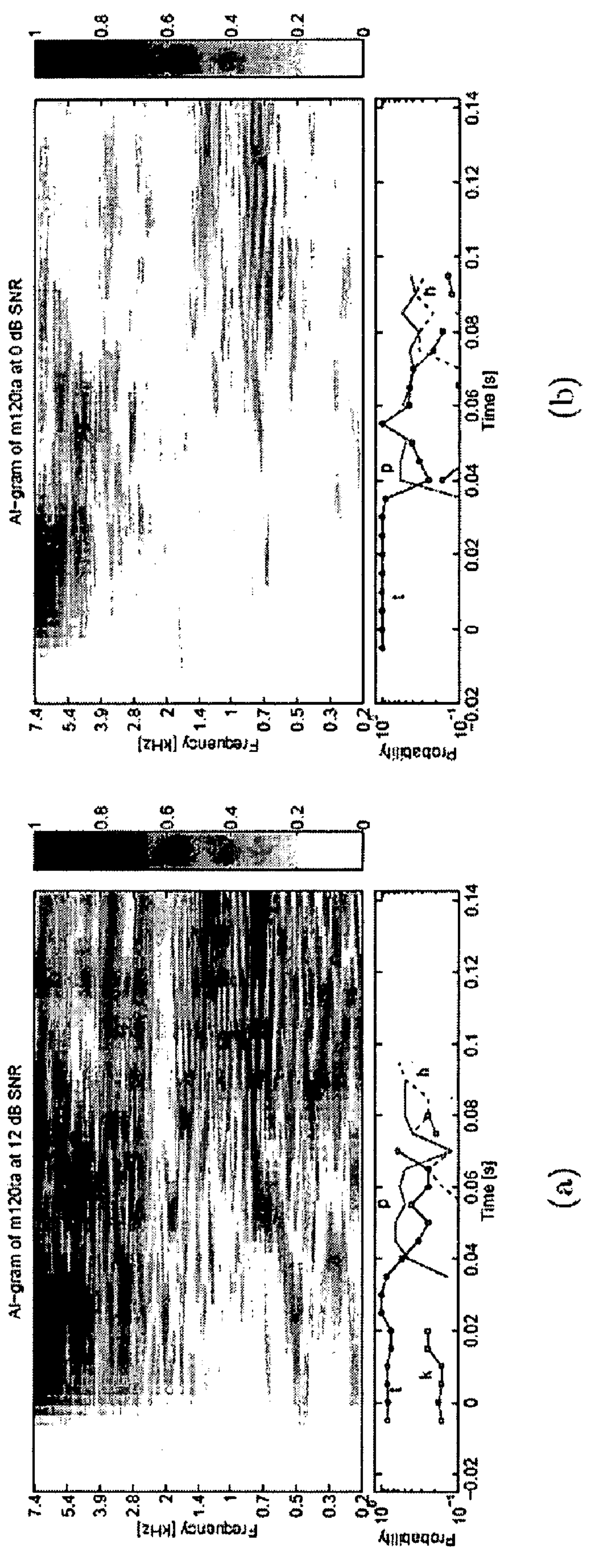
FIG. 10 shows simplified comparisons of the AI-gram and the truncation scores in order to illustrate correlation between physical AI-gram and perceptual scores according to an embodiment of the present invention.

FIGS. 10(*a*) and (*b*) show simplified AI-grams of m120ta, zoomed on the consonant and transition part, at 12 dB SNR and 0 dB SNR respectively according to an embodiment of the present invention. These diagrams are merely examples, which should not unduly limit the scope of the claims. One of ordinary skill in the art would recognize many variations, alternatives, and modifications. Below each AI-gram and time aligned are plotted the responses of our listeners to the truncation of /t/. Unlike other utterances, the /t/ identification is still high after 30 ms of truncation due to remaining high frequency energy. The target probability even overcomes the score for /p/ at 0 dB SNR at a truncation time of 55 ms, most likely because of a strong relative /p/ event present at 12 dB, but weaker at 0 dB.

From FIG. 10, we can see that the burst is very strong for about 35 ms, for both SNRs, which accounts for the high /t/ recognition in this range. For truncation times greater than 35 ms, /t/ is still identified with an average probability of 30%. According to one embodiment, this effect, contrary to other utterances, is due to the high levels of high frequency energy following the burst, which by truncation is cued as a coinciding onset of energy in the frequency range corresponding to that of the /t/ event, and which duration is close to the natural /t/ burst duration. It is weaker than the original strong onset burst, explaining the lower /t/ score. A score inversion takes place at 55 ms at 0 dB SNR, but does not occur at 12 dB SNR, where the score for /p/ overcomes that of /t/. This /t/ peak is also weakly visible at 12 dB (left). One explanation is that a /p/ event is overcoming the /t/ weak burst event. In one embodiment, there is some mid frequency energy, most likely around 0.7 kHz, cueing /p/ at 12 dB, but being masked at 0 dB SNR, enabling the relative /t/ recognition to rise again. This utterance therefore has a behavior similar to that of the other utterances, at least for the first 30 ms of truncation. According to one embodiment, the different pattern observed for later truncation times is an additional demonstration of utterance heterogeneity, but can nonetheless be explained without violating our across-frequency onset burst event principle.

We have concluded from the CV-truncation data that the consonant duration is a timing cue used by listeners to distinguish /t/ from /p/, depending on the natural duration of the /t/ burst according to certain embodiments of the present invention. Moreover, additional results from the truncation experiment show that natural /p/ utterances morph into /bα/, which is consistent with the idea of a hierarchy of speech sounds, clearly present in our /tα/ example, especially for group 1, according to some embodiments of the present invention. Using such a truncation procedure we have independently verified that the high frequency burst accounts for the noise robust event corresponding to the discrimination between /t/ and /p/, even in moderate noisy conditions.

Thus, we confirm that our approach of adding noise to identify the most robust and therefore crucial perceptual information, enables us to identify the primary feature responsible for the correct recognition of /t/ according to certain embodiments of the present invention.

4.3 Analysis

The results of our truncation experiment found that the /t/ recognition drops in 90% of our stimuli after 30 ms. This is in strong agreement with the analysis of the AI-gram and event-gram emphasized by our four-step analysis. Additionally, this also reinforce that across-frequency coincidence, across a specific frequency range, plays a major role in the /t/ recognition, according to an embodiment of the present invention. For example, it seems assured that the leading-edge of the /t/ burst is used across SNR by our listeners to identify /t/ even in small amounts of noise.

Moreover, the /p/ morph that consistently occurs when the /t/ burst is truncated shows that consonants are not independent in the perceptual domain, but that they share common cues according to some embodiments of the present invention. The additional results that truncated /p/ utterances morph to /b/ (not shown) strengthen this hierarchical view, and leads to the possibility of the existence of "root" consonants. Consonant /p/ could be thought as a voiceless stop consonant root containing raw but important spectro-temporal information, to which primary robust-to-noise cues can be added to form consonant of a same confusion group. We have demonstrated here that /t/ may share common cues with /p/, revealed by both masking and truncation of the primary /t/ event, according to some embodiments of the present invention. When CVs are mixed with masking noise, morphing, and also priming, are strong empirical observations that support this conclusion, showing this natural event overlap between consonants of a same category, often belonging to the same confusion group.

The important relevance of the /t/ burst in the consonant identification can be further verified by an experiment controlling the spectro-temporal region of truncation, instead of exclusively focusing on the temporal aspect. Indeed, in this experiment, all frequency components of the burst are removed, which is therefore in agreement with our analysis but does not exclude this existence of low frequency cues, especially at high SNRs. Additionally work can verify that the /t/ recognition significantly drops when about 30 ms of the above 2 kHz burst region is removed. Such an experiment would further prove that this high frequency /t/ event is not only sufficient, but also necessary, to identify /t/ in noise.

5. Summary

The overall approach has taken aims at directly relating the AI-gram, a generalization of the AI and our model of speech audibility in noise, to the confusion pattern discrimination measure for consonant /t/. This approach represents a significant contribution toward solving the speech robustness problem, as it has successfully led to the identification of the /t/ event. The event is common across CVs starting with /t/, even if its physical properties vary across utterances, leading to different levels of robustness to noise. The correlation we have observed between event-gram thresholds and 90% scores fully confirms this hypothesis in a systematic manner across utterances of our database, without however ruling out the existence of other cues (such as formants), that would be more easily masked by SWN than WN.

The truncation experiment, described above, leads to the concept of a possible hierarchy of consonants. It confirms the hypothesis that consonants from a confusion group share common events, and that the /t/ burst is the primary feature for the identification of /t/ even in small amounts of noise. Primary events, along with a shared base of perceptual features, are used to discriminate consonants, and characterize the consonant's degree of robustness.

A verification experiment naturally follows from this analysis to more completely study the impact of a specific truncation, combined with band pass filtering, removing specifically the high frequency /t/ burst. Our strategy would be to further investigate the responses of modified CV syllables from many talkers that have been modified using the Short-Time Fourier transform analysis synthesis, to demonstrate further the impact of modifying the acoustic correlates of events. The implications of such event characterization are multiple. The identification of SNP loss consonant profiles, quantifying hearing impaired losses on a consonant basis, could be an application of event identification; a specifically tuned hearing aid could extract these cues and amplify them on a listener basis resulting in a great improvement of speech identification in noisy environments.

According to certain embodiments, normal hearing listeners' responses is related to nonsense CV sounds (confusion patterns) presented in speech-weighted noise and white noise, with the audible speech information using an articulation-index spectro-temporal model (AI-gram). Several observations, such as the existence of morphing, or natural robustness utterance variability are derived from the analysis of confusion patterns. Then, the studies emphasize a strong correlation between the noise robustness of consonant /t/ and the its ≈2-8 kHz noise burst, which characterizes the /t/ primary event (noise-robust feature). Finally, a truncation experiment, removing the burst in low noise conditions, confirms the loss of /t/ recognition when as low as 30 ms of burst are removed. Relating confusion patterns with the audible speech information visible on the AI-gram seems to be a valuable approach to under-stand speech robustness and confusions. The method can be extended to other sounds.

6. Some Embodiments of the Present Invention

Figure 11:
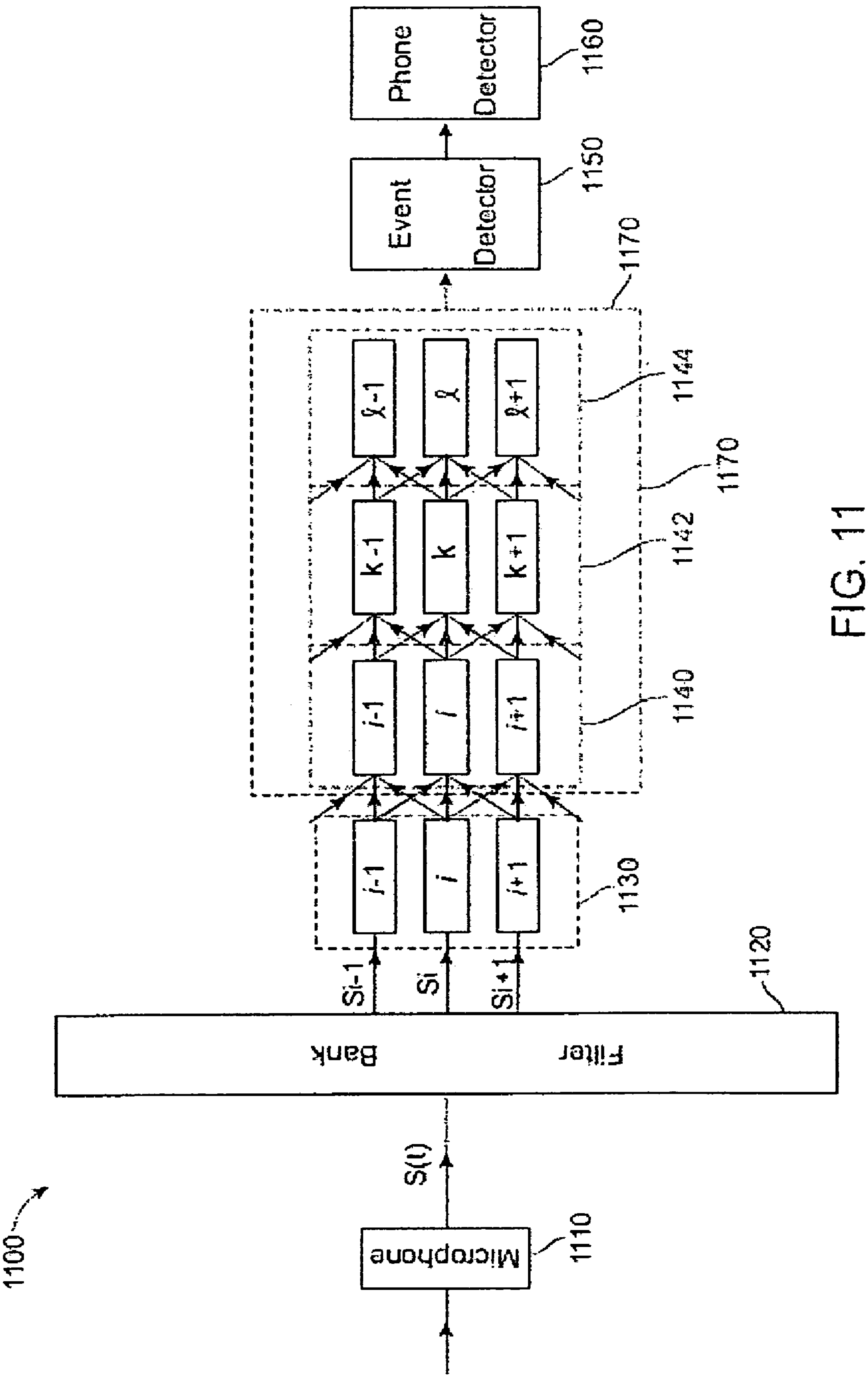
FIG. 11 is a simplified system for phone detection according to an embodiment of the present invention.

FIG. 11 is a simplified system for phone detection according to an embodiment of the present invention. This diagram is merely an example, which should not unduly limit the scope of the claims. One of ordinary skill in the art would recognize many variations, alternatives, and modifications. The system 1100 includes a microphone 1110, a filter bank 1120, onset enhancement devices 1130, a cascade 1170 of across-frequency coincidence detectors, event detector 1150, and a phone detector 1160. For example, the cascade of across-frequency coincidence detectors 1170 include across-frequency coincidence detectors 1140, 1142, and 1144. Although the above has been shown using a selected group of components for the system 1100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

The microphone 1110 is configured to receive a speech signal in acoustic domain and convert the speech signal from acoustic domain to electrical domain. The converted speech signal in electrical domain is represented by s(t). As shown in FIG. 11, the converted speech signal is received by the filter bank 1120, which can process the converted speech signal and, based on the converted speech signal, generate channel speech signals in different frequency channels or bands. For example, the channel speech signals are represented by $s_1, \ldots, s_j, \ldots s_N$. N is an integer larger than 1, and j is an integer equal to or larger than 1, and equal to or smaller than N.

Additionally, these channel speech signals $s_1, \ldots, s_j, \ldots s_N$ each fall within a different frequency channel or band. For example, the channel speech signals $s_1, \ldots, s_j, \ldots s_N$ fall within, respectively, the frequency channels or bands 1, . . . , j, . . . , N. In one embodiment, the frequency channels or bands 1, . . . , j, . . . , N correspond to central frequencies $f_1, \ldots, f_j, \ldots, f_N$, which are different from each other in magnitude. In another embodiment, different frequency channels or bands may partially overlap, even though their central frequencies are different.

The channel speech signals generated by the filter bank 1120 are received by the onset enhancement devices 1130. For example, the onset enhancement devices 1130 include onset enhancement devices 1, . . . , j, . . . , N, which receive, respectively, the channel speech signals $s_1, \ldots, s_j, \ldots s_N$, and generate, respectively, the onset enhanced signals $e_1, \ldots, e_j, \ldots e_N$. In another example, the onset enhancement devices, i−1, i, and i, receive, respectively, the channel speech signals $s_{i-1}$, $s_i$, $s_{i+1}$, and generate, respectively, the onset enhanced signals $e_{i-1}$, $e_i$, $e_{i+1}$.

Figure 12:
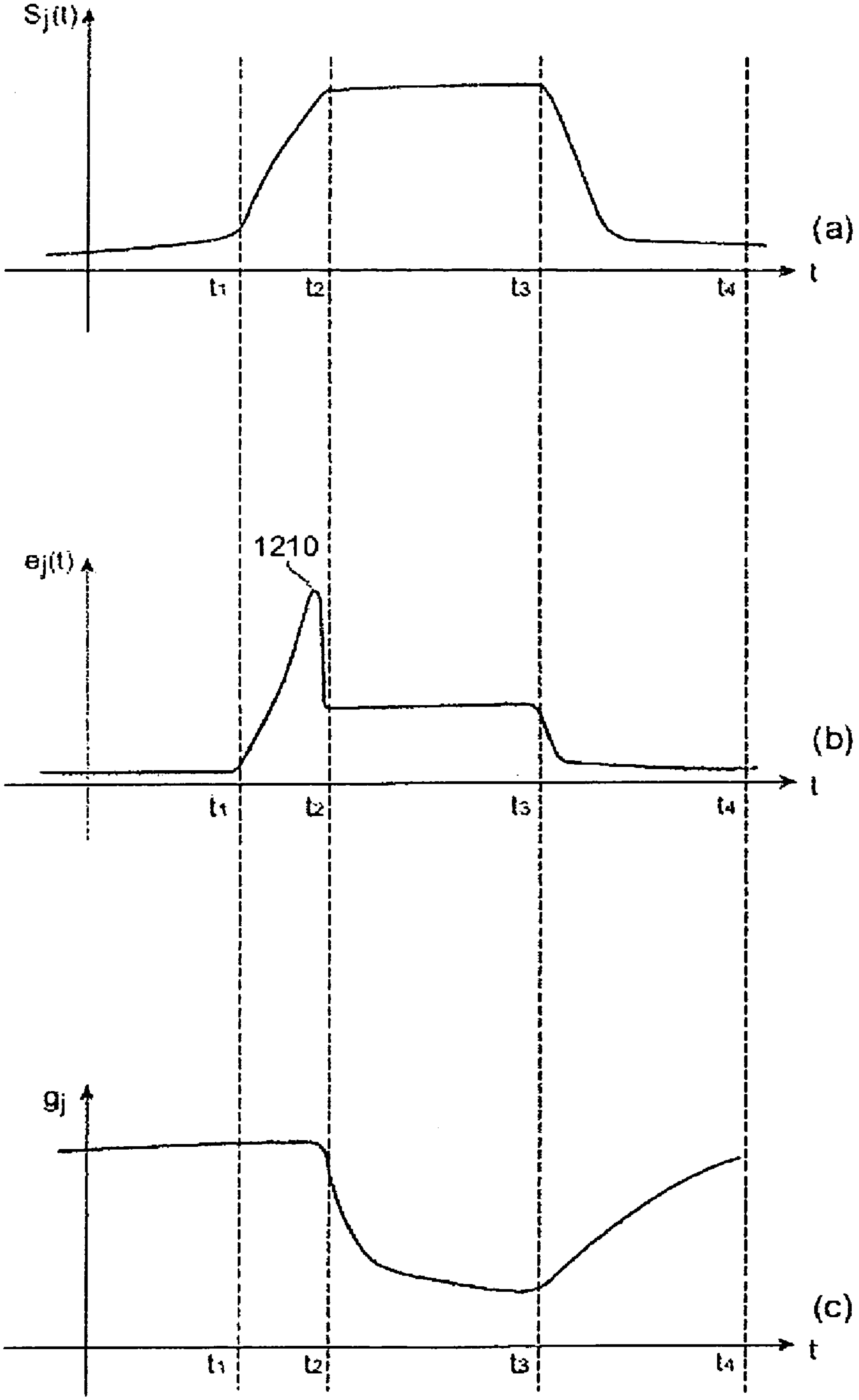
FIG. 12 illustrates onset enhancement for channel speech signal $s_j$ used by system for phone detection according to an embodiment of the present invention.

FIG. 12 illustrates onset enhancement for channel speech signal $s_j$ used by system for phone detection according to an embodiment of the present invention. These diagrams are merely examples, which should not unduly limit the scope of the claims. One of ordinary skill in the art would recognize many variations, alternatives, and modifications.

As shown in FIG. 12(*a*), from $t_1$ to $t_2$, the channel speech signal $s_j$ increases in magnitude from a low level to a high level. From $t_2$ to $t_3$, the channel speech signal $s_j$ maintains a steady state at the high level, and from $t_3$ to $t_4$, the channel speech signal $s_j$ decreases in magnitude from the high level to the low level. Specifically, the rise of channel speech signal $s_j$ from the low level to the high level during $t_1$ to $t_2$ is called onset according to an embodiment of the present invention. The enhancement of such onset is exemplified in FIG. 12(*b*). As shown in FIG. 12(*b*), the onset enhanced signal $e_j$ exhibits a pulse 1210 between $t_1$ and $t_2$. For example, the pulse indicates the occurrence of onset for the channel speech signal $s_j$.

Such onset enhancement is realized by the onset enhancement devices 1130 on a channel by channel basis. For example, the onset enhancement device j has a gain $g_j$ that is much higher during the onset than during the steady state of the channel speech signal $s_j$, as shown in FIG. 12(*c*). As discussed in FIG. 13 below, the gain $g_j$ is the gain that has already been delayed by a delay device 1350 according to an embodiment of the present invention.

Figure 13:
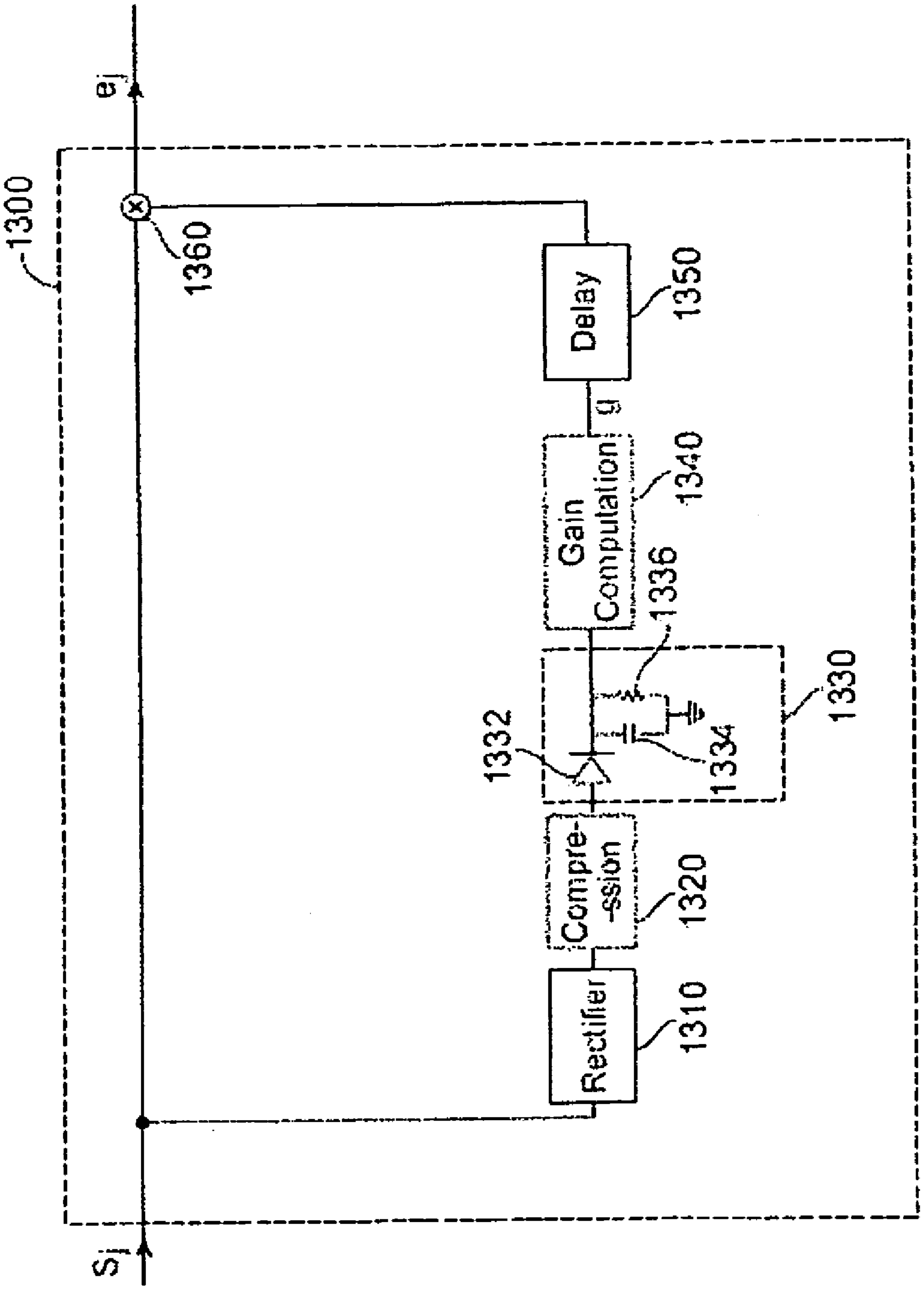
FIG. 13 is a simplified onset enhancement device used for phone detection according to an embodiment of the present invention.

FIG. 13 is a simplified onset enhancement device used for phone detection according to an embodiment of the present invention. This diagram is merely an example, which should not unduly limit the scope of the claims. One of ordinary skill in the art would recognize many variations, alternatives, and modifications. The onset enhancement device 1300 includes a half-wave rectifier 1310, a logarithmic compression device 1320, a smoothing device 1330, a gain computation device 1340, a delay device 1350, and a multiplying device 1360. Although the above has been shown using a selected group of components for the system 1300, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

According to an embodiment, the onset enhancement device 1300 is used as the onset enhancement device j of the onset enhancement devices 1130. The onset enhancement device 1300 is configured to receive the channel speech signal $s_j$, and generate the onset enhanced signal $e_j$. For example, the channel speech signal $s_j(t)$ is received by the half-wave rectifier 1310, and the rectified signal is then compressed by the logarithmic compression device 1320. In another example, the compressed signal is smoothed by the smoothing device 1330, and the smoothed signal is received by the gain computation device 1340. In one embodiment, the smoothing device 1330 includes a diode 1332, a capacitor 1334, and a resistor 1336.

As shown in FIG. 13, the gain computation device 1340 is configured to generate a gain signal. For example, the gain is determined based on the envelope of the signal as shown in FIG. 12(*a*). The gain signal from the gain computation device 1340 is delayed by the delay device 1350. For example, the delayed gain is shown in FIG. 12(*c*). In one embodiment, the delayed gain signal is multiplied with the channel speech signal $s_j$ by the multiplying device 1360 and thus generate the onset enhanced signal $e_j$. For example, the onset enhanced signal $e_j$ is shown in FIG. 12(*b*).

Figure 14:
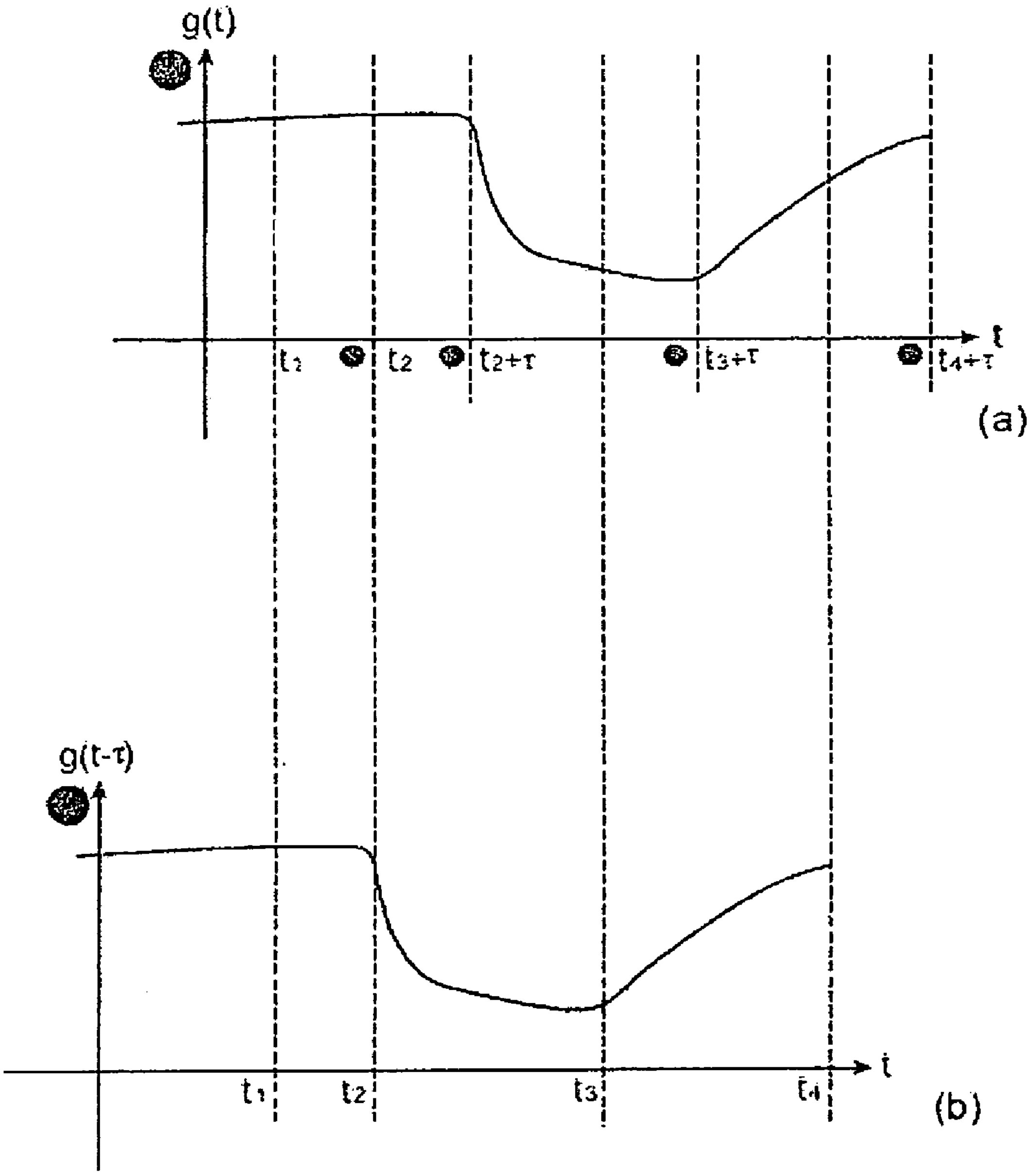
FIG. 14 illustrates pre-delayed gain and delayed gain used for phone detection according to an embodiment of the present invention.

FIG. 14 illustrates pre-delayed gain and delayed gain used for phone detection according to an embodiment of the present invention. These diagrams are merely examples, which should not unduly limit the scope of the claims. One of ordinary skill in the art would recognize many variations, alternatives, and modifications. For example, FIG. 14(*a*) represents the gain g(t) determined by the gain computation device 1340. According to one embodiment, the gain g(t) is delayed by the delay device 1350 by a predetermined period of time τ, and the delayed gain is g(t−τ) as shown in FIG. 14(*b*). For example, τ is equal to $t_2-t_1$. In another example, the delayed gain as shown in FIG. 14(*b*) is the gain $g_j$ as shown in FIG. 12(*c*).

Returning to FIG. 11, the onset enhancement devices 1130 are configured to receive the channel speech signals, and based on the received channel speech signals, generate onset enhanced signals, such as the onset enhanced signals $e_{i-1}$, $e_i$, $e_{i+1}$. The onset enhanced signals can be received by the across-frequency coincidence detectors 1140.

For example, each of the across-frequency coincidence detectors 1140 is configured to receive a plurality of onset enhanced signals and process the plurality of onset enhanced signals. Additionally, each of the across-frequency coincidence detectors 1140 is also configured to determine whether the plurality of onset enhanced signals include onset pulses that occur within a predetermined period of time. Based on such determination, each of the across-frequency coincidence detectors 1140 outputs a coincidence signal. For example, if the onset pulses are determined to occur within the predetermined period of time, the onset pulses at corresponding channels are considered to be coincident, and the coincidence signal exhibits a pulse representing logic "1". In another example, if the onset pulses are determined not to occur within the predetermined period of time, the onset pulses at corresponding channels are considered not to be coincident, and the coincidence signal does not exhibit any pulse representing logic "1".

According to one embodiment, as shown in FIG. 11, the across-frequency coincidence detector i is configured to receive the onset enhanced signals $e_{i-1}$, $e_i$, $e_{i+1}$. Each of the onset enhanced signals includes an onset pulse. For example, the onset pulse is similar to the pulse 1210. In another example, the across-frequency coincidence detector i is configured to determine whether the onset pulses for the onset enhanced signals $e_{i-1}$, $e_i$, $e_{i+1}$ occur within a predetermined period time.

In one embodiment, the predetermined period of time is 10 ms. For example, if the onset pulses for the onset enhanced signals $e_{i-1}$, $e_i$, $e_{i+1}$ are determined to occur within 10 ms, the across-frequency coincidence detector i outputs a coincidence signal that exhibits a pulse representing logic "1" and showing the onset pulses at channels i−1, i, and i+1 are considered to be coincident. In another example, if the onset pulses for the onset enhanced signals $e_{i-1}$, $e_i$, $e_{i+1}$ are determined not to occur within 10 ms, the across-frequency coincidence detector i outputs a coincidence signal that does not exhibit a pulse representing logic "1", and the coincidence signal shows the onset pulses at channels i−1, i, and i+1 are considered not to be coincident.

As shown in FIG. 11, the coincidence signals generated by the across-frequency coincidence detectors 1140 can be received by the across-frequency coincidence detectors 1142. For example, each of the across-frequency coincidence detectors 1142 is configured to receive and process a plurality of coincidence signals generated by the across-frequency coincidence detectors 1140. Additionally, each of the across-frequency coincidence detectors 1142 is also configured to determine whether the received plurality of coincidence signals include pulses representing logic "1" that occur within a predetermined period of time. Based on such determination, each of the across-frequency coincidence detectors 1142 outputs a coincidence signal. For example, if the pulses are determined to occur within the predetermined period of time, the outputted coincidence signal exhibits a pulse representing logic "1" and showing the onset pulses are considered to be coincident at channels that correspond to the received plurality of coincidence signals. In another example, if the pulses are determined not to occur within the predetermined period of time, the outputted coincidence signal does not exhibit any pulse representing logic "1", and the outputted coincidence signal shows the onset pulses are considered not to be coincident at channels that correspond to the received plurality of coincidence signals. According to one embodiment, the predetermined period of time is zero second. According to another embodiment, the across-frequency coincidence detector k is configured to receive the coincidence signals generated by the across-frequency coincidence detectors i−1, i, and i+1.

Furthermore, according to some embodiments, the coincidence signals generated by the across-frequency coincidence detectors 1142 can be received by the across-frequency coincidence detectors 1144. For example, each of the across-frequency coincidence detectors 1144 is configured to receive and process a plurality of coincidence signals generated by the across-frequency coincidence detectors 1142. Additionally, each of the across-frequency coincidence detectors 1144 is also configured to determine whether the received plurality of coincidence signals include pulses representing logic "1" that occur within a predetermined period of time. Based on such determination, each of the across-frequency coincidence detectors 1144 outputs a coincidence signal. For example, if the pulses are determined to occur within the predetermined period of time, the coincidence signal exhibits a pulse representing logic "1" and showing the onset pulses are considered to be coincident at channels that correspond to the received plurality of coincidence signals. In another example, if the pulses are determined not to occur within the predetermined period of time, the coincidence signal does not exhibit any pulse representing logic "1", and the coincidence signal shows the onset pulses are considered not to be coincident at channels that correspond to the received plurality of coincidence signals. According to one embodiment, the predetermined period of time is zero second. According to another embodiment, the across-frequency coincidence detector 1 is configured to receive the coincidence signals generated by the across-frequency coincidence detectors k−1, k, and k+1.

As shown in FIG. 11, the across-frequency coincidence detectors 1140, the across-frequency coincidence detectors 1142, and the across-frequency coincidence detectors 1144 form the three-stage cascade 1170 of across-frequency coincidence detectors between the onset enhancement devices 1130 and the event detectors 1150 according to an embodiment of the present invention. For example, the across-frequency coincidence detectors 1140 correspond to the first stage, the across-frequency coincidence detectors 1142 correspond to the second stage, and the across-frequency coincidence detectors 1144 correspond to the third stage. In another example, one or more stages can be added to the cascade 1170 of across-frequency coincidence detectors. In one embodiment, each of the one or more stages is similar to the across-frequency coincidence detectors 1142. In yet another example, one or more stages can be removed from the cascade 1170 of across-frequency coincidence detectors.

The plurality of coincidence signals generated by the cascade of across-frequency coincidence detectors can be received by the event detector 1150, which is configured to process the received plurality of coincidence signals, determine whether one or more events have occurred, and generate an event signal. For example, the even signal indicates which one or more events have been determined to have occurred. In another example, a given event represents an coincident occurrence of onset pulses at predetermined channels. In one embodiment, the coincidence is defined as occurrences within a predetermined period of time. In another embodiment, the given event may be represented by Event X, Event Y, or Event Z.

According to one embodiment, the event detector 1150 is configured to receive and process all coincidence signals generated by each of the across-frequency coincidence detectors 1140, 1142, and 1144, and determine the highest stage of the cascade that generates one or more coincidence signals that include one or more pulses respectively. Additionally, the event detector 1150 is further configured to determine, at the highest stage, one or more across-frequency coincidence detectors that generate one or more coincidence signals that include one or more pulses respectively, and based on such determination, also determine channels at which the onset pulses are considered to be coincident. Moreover, the event detector 1150 is yet further configured to determine, based on the channels with coincident onset pulses, which one or more events have occurred, and also configured to generate an event signal that indicates which one or more events have been determined to have occurred.

According to one embodiment, FIG. 4 shows events as indicated by the dashed lines that cross in the upper left panels of FIGS. 4(*a*) and (*b*). Two examples are shown for /te/ signals, one having a weak event and the other having a strong event. This variation in event strength is clearly shown to be correlated to the signal to noise ratio of the threshold for perceiving the /t/ sound, as shown in FIG. 4 and again in more detail in FIG. 6. According to another embodiment, an event is shown in FIGS. 6(*b*) and/or (*c*).

For example, the event detector 1150 determines that, at the third stage (corresponding to the across-frequency coincidence detectors 1144), there is no across-frequency coincidence detectors that generate one or more coincidence signals that include one or more pulses respectively, but among the across-frequency coincidence detectors 1142 there are one or more coincidence signals that include one or more pulses respectively, and among the across-frequency coincidence detectors 1140 there are also one or more coincidence signals that include one or more pulses respectively. Hence the event detector 1150 determines the second stage, not the third stage, is the highest stage of the cascade that generates one or more coincidence signals that include one or more pulses respectively according to an embodiment of the present invention. Additionally, the event detector 1150 further determines, at the second stage, which across-frequency coincidence detector(s) generate coincidence signal(s) that include pulse(s) respectively, and based on such determination, the event detector 1150 also determine channels at which the onset pulses are considered to be coincident. Moreover, the event detector 1150 is yet further configured to determine, based on the channels with coincident onset pulses, which one or more events have occurred, and also configured to generate an event signal that indicates which one or more events have been determined to have occurred.

The event signal can be received by the phone detector 1160. The phone detector is configured to receive and process the event signal, and based on the event signal, determine which phone has been included in the speech signal received by the microphone 1110. For example, the phone can be /t/, /m/, or /n/. In one embodiment, if only Event X has been detected, the phone is determined to be /t/. In another embodiment, if Event X and Event Y have been detected with a delay of about 50 ms between each other, the phone is determined to be /m/.

As discussed above and further emphasized here, FIG. 11 is merely an example, which should not unduly limit the scope of the claims. One of ordinary skill in the art would recognize many variations, alternatives, and modifications. For example, the across-frequency coincidence detectors 1142 are removed, and the across-frequency coincidence detectors 1140 are coupled with the across-frequency coincidence detectors 1144. In another example, the across-frequency coincidence detectors 1142 and 1144 are removed.

According to another embodiment, a system for phone detection includes a microphone configured to receive a speech signal in an acoustic domain and convert the speech signal from the acoustic domain to an electrical domain, and a filter bank coupled to the microphone and configured to receive the converted speech signal and generate a plurality of channel speech signals corresponding to a plurality of channels respectively. Additionally, the system includes a plurality of onset enhancement devices configured to receive the plurality of channel speech signals and generate a plurality of onset enhanced signals. Each of the plurality of onset enhancement devices is configured to receive one of the plurality of channel speech signals, enhance one or more onsets of one or more signal pulses for the received one of the plurality of channel speech signals, and generate one of the plurality of onset enhanced signals. Moreover, the system includes a cascade of across-frequency coincidence detectors configured to receive the plurality of onset enhanced signals and generate a plurality of coincidence signals. Each of the plurality of coincidence signals is capable of indicating a plurality of channels at which a plurality of pulse onsets occur within a predetermined period of time, and the plurality of pulse onsets corresponds to the plurality of channels respectively. Also, the system includes an event detector configured to receive the plurality of coincidence signals, determine whether one or more events have occurred, and generate an event signal, the event signal being capable of indicating which one or more events have been determined to have occurred. Additionally, the system includes a phone detector configured to receive the event signal and determine which phone has been included in the speech signal received by the microphone. For example, the system is implemented according to FIG. 11.

According to yet another embodiment, a system for phone detection includes a plurality of onset enhancement devices configured to receive a plurality of channel speech signals generated from a speech signal in an acoustic domain, process the plurality of channel speech signals, and generate a plurality of onset enhanced signals. Each of the plurality of onset enhancement devices is configured to receive one of the plurality of channel speech signals, enhance one or more onsets of one or more signal pulses for the received one of the plurality of channel speech signals, and generate one of the plurality of onset enhanced signals. Additionally, the system includes a cascade of across-frequency coincidence detectors including a first stage of across-frequency coincidence detectors and a second stage of across-frequency coincidence detectors. The cascade is configured to receive the plurality of onset enhanced signals and generate a plurality of coincidence signals. Each of the plurality of coincidence signals is capable of indicating a plurality of channels at which a plurality of pulse onsets occur within a predetermined period of time, and the plurality of pulse onsets corresponds to the plurality of channels respectively. Moreover, the system includes an event detector configured to receive the plurality of coincidence signals, and determine whether one or more events have occurred based on at least information associated with the plurality of coincidence signals. The event detector is further configured to generate an event signal, and the event signal is capable of indicating which one or more events have been determined to have occurred. Also, the system includes a phone detector configured to receive the event signal and determine, based on at least information associated with the event signal, which phone has been included in the speech signal in the acoustic domain. For example, the system is implemented according to FIG. 11.

According to yet another embodiment, a method for phone detection includes receiving a speech signal in an acoustic domain, converting the speech signal from the acoustic domain to an electrical domain, processing information associated with the converted speech signal, and generating a plurality of channel speech signals corresponding to a plurality of channels respectively based on at least information associated with the converted speech signal. Additionally, the method includes processing information associated with the plurality of channel speech signals, enhancing one or more onsets of one or more signal pulses for the plurality of channel speech signals to generate a plurality of onset enhanced signals, processing information associated with the plurality of onset enhanced signals, and generating a plurality of coincidence signals based on at least information associated with the plurality of onset enhanced signals. Each of the plurality of coincidence signals is capable of indicating a plurality of channels at which a plurality of pulse onsets occur within a predetermined period of time, and the plurality of pulse onsets corresponds to the plurality of channels respectively. Moreover, the method includes processing information associated with the plurality of coincidence signals, determining whether one or more events have occurred based on at least information associated with the plurality of coincidence signals, generating an event signal, the event signal being capable of indicating which one or more events have been determined to have occurred, processing information associated with the event signal, and determining which phone has been included in the speech signal in the acoustic domain. For example, the method is implemented according to FIG. 11.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for phone detection, the system comprising:

a microphone configured to receive a speech signal in an acoustic domain and convert the speech signal from the acoustic domain to an electrical domain;

a filter bank coupled to the microphone and configured to receive the converted speech signal and generate a plurality of channel speech signals corresponding to a plurality of channels respectively;

a plurality of onset enhancement devices configured to receive the plurality of channel speech signals and generate a plurality of onset enhanced signals, each of the plurality of onset enhancement devices being configured to receive one of the plurality of channel speech signals, enhance one or more onsets of one or more signal pulses for the received one of the plurality of channel speech signals, and generate one of the plurality of onset enhanced signals;

one or more across-frequency coincidence detectors configured to receive the plurality of onset enhanced signals and generate one or more coincidence signals, each of the one or more coincidence signals capable of indicating a plurality of channels at which a plurality of pulse onsets occur within a predetermined period of time, the plurality of pulse onsets corresponding to the plurality of channels respectively;

an event detector configured to receive the one or more coincidence signals, determine whether one or more events have occurred, and generate an event signal, the event signal being capable of indicating which one or more events have been determined to have occurred;

a phone detector configured to receive the event signal and determine which phone has been included in the speech signal received by the microphone.

2. The system of claim 1 wherein the one or more across-frequency coincidence detectors comprise one or more stages of across-frequency coincidence detectors.

3. The system of claim 2 wherein the one or more stages of across-frequency coincidence detectors includes a first stage of across-frequency coincidence detectors and a second stage of across-frequency coincidence detectors.

4. The system of claim 3 wherein:

the first stage of across-frequency coincidence detectors includes a first plurality of across-frequency coincidence detectors configured to output first coincidence signals, the plurality of coincidence signals including the first coincidence signals;

each of the first plurality of across-frequency coincidence detectors configured to receive two or more of the plurality of onset enhanced signals and generate one of the first coincidence signals.

5. The system of claim 4 wherein:

the second stage of across-frequency coincidence detectors includes a second plurality of across-frequency coincidence detectors configured to output second coincidence signals, the plurality of coincidence signals further including the second coincidence signals;

each of the second plurality of across-frequency coincidence detectors configured to receive two or more of the first coincidence signals and generate one of the second coincidence signals.

6. The system of claim 2 wherein the one or more across-frequency coincidence detectors comprise a plurality of stages of across-frequency coincidence detectors arranged in a cascade.

7. The system of claim 1 wherein the each of the plurality of onset enhancement devices includes:

a half-wave rectifier configured to receive and rectify the one of the plurality of channel speech signals;

a logarithmic compression device coupled to the half-wave rectifier and configured to compress the rectified one of the plurality of channel speech signals;

a smoothing device coupled to the logarithmic compression device and configured to smooth the compressed one of the plurality of channel speech signals;

a gain device configured to receive the smoothed one of the plurality of channel speech signals and generate a gain signal;

a delay device coupled to the gain device and configured to receive and delay the gain signal;

a multiplying device configured to receive the delayed gain signal and the one of the plurality of channel speech signals and generate the one of the plurality of onset enhanced signals.

8. The system of claim 1 wherein the predetermined period of time is equal to about 10 ms.

9. The system of claim 1 wherein the phone detector is configured to determine /m/ has been included in the speech signal received by the microphone if a first event and a second event have been determined to have occurred with a delay of about 50 ms from each other.

10. The system of claim 1 wherein the phone detector is configured to determine /t/ has been included in the speech signal received by the microphone if only one event has been determined to have occurred.

11. The system of claim 1 wherein the plurality of channels corresponds to a plurality of central frequencies respectively, the plurality of central frequencies being different from each other.

12. The system of claim 11 wherein the plurality of channels includes a first channel and a second channel, the first channel partially overlapping with the second channel.

13. The system of claim 1 wherein the channels that correspond to the channel speech signals comprise a frequency channel or band;

wherein a plurality of the channels partially overlap; and wherein the plurality of the channels have a different central frequency.

14. A system for phone detection, the system comprising:

a plurality of onset enhancement devices configured to receive a plurality of channel speech signals generated from a speech signal in an acoustic domain, process the plurality of channel speech signals, and generate a plurality of onset enhanced signals, each of the plurality of onset enhancement devices being configured to receive one of the plurality of channel speech signals, enhance one or more onsets of one or more signal pulses for the received one of the plurality of channel speech signals, and generate one of the plurality of onset enhanced signals;

a cascade of across-frequency coincidence detectors including a first stage of across-frequency coincidence detectors and a second stage of across-frequency coincidence detectors, the cascade being configured to receive the plurality of onset enhanced signals and generate a plurality of coincidence signals, each of the plurality of coincidence signals capable of indicating a plurality of channels at which a plurality of pulse onsets occur within a predetermined period of time, the plurality of pulse onsets corresponding to the plurality of channels respectively;

an event detector configured to receive the plurality of coincidence signals, and determine whether one or more events have occurred based on at least information associated with the plurality of coincidence signals, the event detector being further configured to generate an event signal, the event signal being capable of indicating which one or more events have been determined to have occurred;

a phone detector configured to receive the event signal and determine, based on at least information associated with the event signal, which phone has been included in the speech signal in the acoustic domain.

15. The system of claim 14 wherein:

the first stage of across-frequency coincidence detectors includes a first plurality of across-frequency coincidence detectors configured to output first coincidence signals, the plurality of coincidence signals including the first coincidence signals;

each of the first plurality of across-frequency coincidence detectors configured to receive two or more of the plurality of onset enhanced signals and generate one of the first coincidence signals.

16. The system of claim 15 wherein:

the second stage of across-frequency coincidence detectors includes a second plurality of across-frequency coincidence detectors configured to output second coincidence signals, the plurality of coincidence signals further including the second coincidence signals;

each of the second plurality of across-frequency coincidence detectors configured to receive two or more of the first coincidence signals and generate one of the second coincidence signals.

17. A method for phone detection, the method comprising:

receiving a speech signal in an acoustic domain;

converting the speech signal from the acoustic domain to an electrical domain;

processing information associated with the converted speech signal;

generating a plurality of channel speech signals corresponding to a plurality of channels respectively based on at least information associated with the converted speech signal;

processing information associated with the plurality of channel speech signals;

enhancing one or more onsets of one or more signal pulses for the plurality of channel speech signals to generate a plurality of onset enhanced signals;

processing information associated with the plurality of onset enhanced signals;

generating a plurality of coincidence signals based on at least information associated with the plurality of onset enhanced signals, each of the plurality of coincidence signals capable of indicating a plurality of channels at which a plurality of pulse onsets occur within a predetermined period of time, the plurality of pulse onsets corresponding to the plurality of channels respectively;

processing information associated with the plurality of coincidence signals;

determining whether one or more events have occurred based on at least information associated with the plurality of coincidence signals;

generating an event signal, the event signal being capable of indicating which one or more events have been determined to have occurred;

processing information associated with the event signal;

determining which phone has been included in the speech signal in the acoustic domain.

18. The method of claim 17 wherein the predetermined period of time is equal to about 10 ms.

19. The method of claim 17 wherein the process for determining which phone has been included in the speech signal in the acoustic domain includes determining /m/ has been included in the speech signal in the acoustic domain if a first event and a second event have been determined to have occurred with a delay of about 50 ms from each other.

20. The method of claim 17 wherein the process for determining which phone has been included in the speech signal in the acoustic domain includes determining /t/ has been included in the speech signal in the acoustic domain if only one event has been determined to have occurred.

21. The method of claim 17 wherein the plurality of channels corresponds to a plurality of central frequencies respectively, the plurality of central frequencies being different from each other.

22. The method of claim 21 wherein the plurality of channels includes a first channel and a second channel, the first channel partially overlapping with the second channel.

* * * * *